(12) United States Patent
Athelogou et al.

(10) Patent No.: US 8,391,575 B2
(45) Date of Patent: Mar. 5, 2013

(54) AUTOMATIC IMAGE ANALYSIS AND QUANTIFICATION FOR FLUORESCENCE IN SITU HYBRIDIZATION

(75) Inventors: Maria Athelogou, Munich (DE); Gerd Binnig, Kottgeisering (DE); Guenter Schmidt, Munich (DE); Tamara Manuelian, Hamburg (DE); Joachim Diebold, Neuried (DE)

(73) Assignee: Definiens AG, Munich (DE)

( * ) Notice: Subject to any disclaimer, the term of this patent is extended or adjusted under 35 U.S.C. 154(b) by 11 days.

(21) Appl. No.: 13/199,412

(22) Filed: Aug. 29, 2011

(65) Prior Publication Data
US 2012/0237106 A1 Sep. 20, 2012

Related U.S. Application Data

(63) Continuation of application No. 11/607,557, filed on Nov. 30, 2006, now Pat. No. 8,019,134.

(51) Int. Cl.
G06K 9/00 (2006.01)
(52) U.S. Cl. .......................... 382/128; 382/224
(58) Field of Classification Search .................. 382/128, 382/224
See application file for complete search history.

(56) References Cited

U.S. PATENT DOCUMENTS

| 4,809,347 A | 2/1989 | Nash et al. ...................... 382/240 |
| 4,868,733 A | 9/1989 | Fujisawa et al. ............... 364/200 |
| 5,123,057 A | 6/1992 | Verly et al. ..................... 382/156 |
| 5,193,185 A | 3/1993 | Lanter ............................ 707/101 |
| 5,278,946 A | 1/1994 | Shimada et al. ................ 706/53 |
| 5,537,485 A | 7/1996 | Nishikawa et al. ........... 382/130 |
| 5,631,970 A | 5/1997 | Hsu ................................ 382/113 |
| 5,809,212 A | 9/1998 | Shasha ............................ 706/46 |
| 5,872,859 A | 2/1999 | Gur et al. ....................... 382/128 |
| 5,937,400 A | 8/1999 | Au .................................. 706/55 |
| 6,018,728 A | 1/2000 | Spence et al. ................... 706/20 |
| 6,058,322 A | 5/2000 | Nishikawa et al. ........... 600/408 |
| 6,075,878 A | 6/2000 | Yoshida et al. ............... 382/132 |
| 6,075,879 A | 6/2000 | Roehrig et al. ............... 382/132 |

(Continued)

FOREIGN PATENT DOCUMENTS

DE 19908204 A1 10/1998
WO WO 01/45033 A2 12/1999

(Continued)

OTHER PUBLICATIONS

U.S. Appl. No. 09/806,727, filed Sep. 24, 1999, Schmidt et al.

(Continued)

*Primary Examiner* — Hadi Akhavannik
(74) *Attorney, Agent, or Firm* — Imperium Patent Works; Darien K. Wallace

(57) ABSTRACT

An analysis system automatically analyzes and counts fluorescence signals present in biopsy tissue marked using Fluorescence in situ Hybridization (FISH). The user of the system specifies classes of a class network and process steps of a process hierarchy. Then pixel values in image slices of biopsy tissue are acquired in three dimensions. A computer-implemented network structure is generated by linking pixel values to objects of a data network according to the class network and process hierarchy. Objects associated with pixel values at different depths of the biopsy tissue are used to determine the number, volume and distance between cell components. In one application, fluorescence signals that mark Her2/neural genes and centromeres of chromosome seventeen are counted to diagnose breast cancer. Her2/neural genes that overlap one another or that are covered by centromeres can be accurately counted. Signal artifacts that do not mark genes can be identified by their excessive volume.

18 Claims, 35 Drawing Sheets

U.S. PATENT DOCUMENTS

| | | | |
|---|---|---|---|
| 6,182,062 B1 | 1/2001 | Fujisawa et al. | 707/3 |
| 6,246,782 B1 | 6/2001 | Shapiro et al. | 382/128 |
| 6,282,305 B1 | 8/2001 | Huo et al. | 382/128 |
| 6,320,976 B1 | 11/2001 | Murthy et al. | 382/128 |
| 6,324,532 B1 | 11/2001 | Spence et al. | 706/27 |
| 6,389,305 B1 | 5/2002 | Deban et al. | 600/427 |
| 6,453,058 B1 | 9/2002 | Murthy et al. | 382/128 |
| 6,574,357 B2 | 6/2003 | Wang | 382/132 |
| 6,625,303 B1 | 9/2003 | Young et al. | 382/132 |
| 6,650,766 B1 | 11/2003 | Rogers et al. | 382/132 |
| 6,751,621 B1 | 6/2004 | Calistri-Yeh et al. | 707/100 |
| 6,763,128 B1 | 7/2004 | Rogers et al. | 382/130 |
| 6,778,970 B2 | 8/2004 | Au | 706/55 |
| 6,792,418 B1 | 9/2004 | Binnig et al. | 707/3 |
| 6,801,645 B1 | 10/2004 | Collins et al. | 382/130 |
| 6,871,199 B1 | 3/2005 | Binnig et al. | 707/5 |
| 6,937,776 B2 | 8/2005 | Li et al. | 382/260 |
| 6,970,587 B1 | 11/2005 | Rogers | 382/132 |
| 2001/0036304 A1 | 11/2001 | Yang et al. | 382/132 |
| 2002/0188436 A1 | 12/2002 | Schmidt et al. | 704/1 |
| 2003/0016850 A1 | 1/2003 | Kaufman et al. | 382/128 |
| 2003/0086596 A1 | 5/2003 | Hipp et al. | 382/128 |
| 2003/0115175 A1 | 6/2003 | Baatz et al. | 707/1 |
| 2004/0148296 A1 | 7/2004 | Schaepe et al. | 707/100 |
| 2004/0190789 A1 | 9/2004 | Liu et al. | 382/274 |
| 2005/0265588 A1 | 12/2005 | Gholap et al. | 382/128 |
| 2006/0093199 A1 | 5/2006 | Fram et al. | 382/128 |
| 2007/0122017 A1* | 5/2007 | Binnig et al. | 382/128 |
| 2008/0112604 A1* | 5/2008 | Lloyd | 382/131 |

FOREIGN PATENT DOCUMENTS

| | | |
|---|---|---|
| WO | WO 00/60497 A3 | 3/2000 |

OTHER PUBLICATIONS

U.S. Appl. No. 09/958,108, filed Mar. 30, 2000, Baatz et al.

Baatz et al., "Object-oriented image analysis for high content screening: Detailed quantification of cells and sub cellular structures with the Cellenger software," Wiley, Cytometry Part A; Special Issue: Slide-Based Cytometry in Cytomics, vol. 69A, Issue 7, Jul. 2006; first published online; May 5, 2006; DOI 10.1002/cyto.a.20289; pp. 652-658.

Bottoni et al., "Matching the resolution level to salient image features", Pattern Recognition Society, Pergamon Press, Elmsford, NY, vol. 31, No. 1, 1998; pp. 89-104; XP004101071; ISSN: 0031-3203/98.

Dellepiane et al., "Model Generation and Model Matching of Real Images by a Fuzzy Approach", Pattern Recognition, Pergamon Press, vol. 25, No. 2, 1992; pp. 115-129, 131-137; XP000263519; ISSN: 0031-3203/92.

Fahmy et al, "A Graph-Rewriting Paradigm for Discreet Relaxation Appl. to Sheet-Music Recognition", Int'l Jour. of Pattern Recognition and Artificial Intelligence, vol. 12, No. 6 (1998); pp. 763-799; XP000781900; ISSN: 0218-0014.

Gabber et al., "Consistent, Yet Anonymous, Web Access with LPWA", Feb. 1999/vol. 42, No. 2, Communications of the ACM, pp. 42-47.

Graves et al., "Graph Database Systems", IEEE Engineering in Medicine and Biology Magazine, IEEE Inc., New York, vol. 14, No. 6; Nov. 1, 1995; pp. 737-745; XP000598298; ISSN: 0739-5175.

Karp, P. D., "An ontology for biological function based on molecular interactions", Bioinformatics, vol. 16, No. 3; Mar. 2000; pp. 269-285; XP002207394.

Kuan et al., "Constraint-Based Image Understanding System for Aerial Imagery Interpretation", Annual Artificial Intelligence Systems, IEEE Comp. Soc. Press; Bd. Conf. 4; Mar. 27, 1989; pp. 141-147; XP000040023.

Niemann et al., "ERNEST: A Semantic Network System for Pattern Understanding", IEEE Transactions on Pattern Analysis and Machine Intelligence, vol. 12. No. 9, Sep. 1990, pp. 883-905.

Niemann et al., "Knowledge Based Image Understanding by Iterative Optimization", German Conference on Artificial Intelligence, Springer Verlag, vol. 1; Sep. 17, 1996; pp. 287-301; XP000992226.

Office action dated Mar. 10, 2011 of the German Patent Office in the related German patent application DE102007018034.0 citing documents A and B; 3 pages.

Parazza et al., "Method for 3D volumetric analysis of intranuclear fluorescence distribution in confocal microscopy," Elsevier Science Ltd.: Computerized Medical Imaging and Graphics, vol. 17, issue 3, May-Jun. 1993; pp. 189-200.

Paton et al., "Conceptual modeling of genomic information", Bioinformatics, vol. 16, No. 6; Jun. 2000; pp. 548-557; XP002207395.

Research application "Cellular FISH analysis" using Ariol Cellular FISH module, Applied Imaging, San Jose, CA downloaded Oct. 11, 2006 from www.aicorp.com/products/02cellFISH.htm (7 pages).

Yu et al, "Representing Genomic Knowledge in the UMLS Semantic Network", Proceedings of the 1999 American Medical Informatics Ass. Symposium; Nov. 6-10, 1999; pp. 181-185; XP002207393.

* cited by examiner

CLASS NETWORK

SPECIFY A CLASS NETWORK

PROCESS HIERARCHY

SPECIFY A PROCESS HIERARCHY

SPECIFICATION MODE

EXECUTION MODE

PERFORM DATA ANALYSIS AND
GENERATE DATA NETWORK

EXECUTE PROCESS STEPS

GENERATE DOMAIN
OF PROCESS STEP

DATA NETWORK OF A
3-DIMENSIONAL OBJECT

```xml
<?xml version="1.0" encoding="UTF-8" ?>
- <eCog.Proc UserName="Maria" Company="" Copyright="" version="20050718" use-
    reproducable-poly="0" NumLvl="4" project-unit="1" engine-version="5.1.0" engine-
    build="432">
    <!-- Below are Image Layers  -->
  + <ImgLayers>
    <!-- Below are Thematic Layers  -->
  + <ThmLayers>
    <!-- Below are Map Levels  -->
  + <MapLvlProxyCntnr>
    <ParamValueSetCntnr />
    <!-- Below are Variables for Process Steps  -->
  + <ProcVrblCntnr>
    <!-- Below are the Classes of the Class Network; See e.g., FIG.13  -->
  + <ClssHrchy EvalInvalid="1" MinProb="0.10000000000000001"
      NNSlope="0.20000000000000001" PrjctBaseUnit="1" NumGisChnl="0">
    <!-- Below are Samples for training the analysis system  -->
  + <Smpls>
    <CustProcAlgrList />
    <!-- Below are Process Steps of the Process Hierarchy; See FIG. 15  -->
  + <ProcessList>
    <LcnsIds />
  - <Behaviour>
      <DistCalc mode="CG" />
    </Behaviour>
  </eCog.Proc>
```

FIG. 34

```xml
<?xml version="1.0" encoding="UTF-8" ?>
- <eCog.Proc UserName="Maria" Company="" Copyright="" version="20050718" use-reproducable-
    poly="0" NumLvl="4" project-unit="1" engine-version="5.1.0" engine-build="432">
    <!-- Below are Image Layers   -->
  + <ImgLayers>
    <!-- Below are Thematic Layers   -->
  + <ThmLayers>
    <!-- Below are Map Levels   -->
  + <MapLvlProxyCntnr>
    <ParamValueSetCntnr />
    <!-- Below are Variables for Process Steps   -->
  + <ProcVrblCntnr>
    <!-- Below are the Classes of the Class Network; See e.g., FIG.13   -->
  - <ClssHrchy EvalInvalid="1" MinProb="0.10000000000000001"
      NNSlope="0.20000000000000001" PrjctBaseUnit="1" NumGisChnl="0">
    - <AllClss>
        <!-- Below is the Image Border class; See FIG.13   -->
      + <Clss id="1" name="image border" flag="0" iMaskID="-1" termType="0"
          strUserName="tmanuelian" tChngTime="1122972150" bShow="0" sComment="">
        <!-- Below is the Background class; See FIG.13   -->
      + <Clss id="2" name="background" flag="0" iMaskID="-1" termType="0"
          strUserName="TManuelian" tChngTime="1128460280" bShow="0" sComment="">
      + <Clss id="3" name="active" flag="0" iMaskID="-1" termType="0"
          strUserName="TManuelian" tChngTime="1127809818" bShow="0" sComment="">
      + <Clss id="4" name="foreground" flag="0" iMaskID="-1" termType="0"
          strUserName="TManuelian" tChngTime="1128498223" bShow="0" sComment="">
      + <Clss id="5" name="nucleus_candidate" flag="0" iMaskID="-1" termType="0"
          strUserName="tmanuelian" tChngTime="1125388601" bShow="0" sComment="">
      + <Clss id="6" name="active 2" flag="0" iMaskID="-1" termType="0"
          strUserName="TManuelian" tChngTime="1127816412" bShow="0" sComment="">
        <!-- Below is the Cells class; See FIG.13   -->                          143
      + <Clss id="7" name="cell" flag="0" iMaskID="-1" termType="0" strUserName="Maria"
          tChngTime="1141142392" bShow="0" sComment="">
      + <Clss id="9" name="seed" flag="0" iMaskID="-1" termType="0"
          strUserName="TManuelian" tChngTime="1139402685" bShow="0" sComment="">
      + <Clss id="42" name="active 3" flag="0" iMaskID="-1" termType="0"
          strUserName="TManuelian" tChngTime="1127390150" bShow="0" sComment="">
      + <Clss id="43" name="dark" flag="0" iMaskID="-1" termType="0"
          strUserName="TManuelian" tChngTime="1127808489" bShow="0" sComment="">
      + <Clss id="45" name="cell with signal" flag="0" iMaskID="-1" termType="0"
          strUserName="TManuelian" tChngTime="1140687634" bShow="0" sComment="">
        <!-- Below is the Her-2/neu Gene class; See FIG.13   -->
      + <Clss id="46" name="Her2neu/signal" flag="0" iMaskID="-1" termType="0"
          strUserName="Maria" tChngTime="1141132515" bShow="0" sComment="">
      + <Clss id="47" name="cell without Her2/neu signal" flag="0" iMaskID="-1"
          termType="0" strUserName="TManuelian" tChngTime="1128460058" bShow="0"
          sComment="">
        <!-- Below is a Helper Class for training the analysis system; See
          FIG.13   -->                                                           144
      + <Clss id="48" name="potential Her2/neu" flag="0" iMaskID="-1" termType="0"
          strUserName="TManuelian" tChngTime="1140692848" bShow="0" sComment="">
```

FIG. 35A

```
<!-- Below is the Centromere class; See FIG. 13  -->
+ <Clss id="49" name="chromosome 17 signal" flag="0" iMaskID="-1" termType="0"
    strUserName="TManuelian" tChngTime="1128460772" bShow="0" sComment="">
+ <Clss id="50" name="true cell" flag="0" iMaskID="-1" termType="0"
    strUserName="TManuelian" tChngTime="1140694866" bShow="0" sComment="">
+ <Clss id="51" name="ClassValue" flag="0" iMaskID="-1" termType="0"
    strUserName="TManuelian" tChngTime="1140699730" bShow="0" sComment="">
+ <Clss id="52" name="2D classes" flag="2" iMaskID="-1" termType="0"
    strUserName="Maria" tChngTime="1141135354" bShow="0" sComment="">
+ <Clss id="53" name="OOI OK" flag="0" iMaskID="-1" termType="0"
    strUserName="Maria" tChngTime="1139847542" bShow="0" sComment="">
+ <Clss id="54" name="clear Her2Signale" flag="0" iMaskID="-1" termType="0"
    strUserName="Maria" tChngTime="1139852285" bShow="0" sComment="">
+ <Clss id="55" name="clear Chr17 Signals Non Overlapping to Her2" flag="0"
    iMaskID="-1" termType="0" strUserName="Maria" tChngTime="1139851411"
    bShow="0" sComment="">
  <!-- Below is the Centromere Overlapping A Gene class; See FIG.13  -->
+ <Clss id="56" name="Chr7Signals Overlapping to Her2Signals" flag="0" iMaskID="-
    1" termType="0" strUserName="Maria" tChngTime="1139929299" bShow="0"
    sComment="">
+ <Clss id="62" name="slide small" flag="0" iMaskID="-1" termType="0"
    strUserName="Maria" tChngTime="1138123214" bShow="0" sComment="">
+ <Clss id="63" name="slides" flag="0" iMaskID="-1" termType="0"
    strUserName="Maria" tChngTime="1138123222" bShow="0" sComment="">
+ <Clss id="64" name="slide big" flag="0" iMaskID="-1" termType="0"
    strUserName="Maria" tChngTime="1138725450" bShow="0" sComment="">
+ <Clss id="65" name="all classes to find object" flag="2" iMaskID="-1" termType="0"
    strUserName="Maria" tChngTime="1138199054" bShow="0" sComment="">
+ <Clss id="2473" name="OOI-overlapp" flag="0" iMaskID="-1" termType="0"
    strUserName="Maria" tChngTime="1140096628" bShow="0" sComment="">
+ <Clss id="3205" name="small signals" flag="0" iMaskID="-1" termType="0"
    strUserName="Maria" tChngTime="1140447694" bShow="0" sComment="">
  </AllClss>
+ <AllProps>
+ <ChnlWghtBrght>
+ <AllSubClss>
+ <AllTerm>
  </ClssHrchy>
  <!-- Below are Samples for training the analysis system  -->
- <Smpls>
+ <AllClss>
+ <AllProp>
  </Smpls>
  <CustProcAlgrList />
  <!-- Below are Process Steps of the Process Hierarchy; See FIG. 15  -->
- <ProcessList>
    <!-- Below is the Root Process Step of the Process Hierarchy; See 105 in
    FIG.15  -->
  - <ProcBase Name="FISH 3D Analysis" bLoopChg="0" iMaxCycle="1" bExpand="0"
      bActive="1" bAutoName="0" sComment="">
      <LensInfo tLensId="0" sPwd="" />
```

```xml
- <Algorithm guid="A8BA5775-CC39-4194-9A6A-A64872EE1F81">
    <Params />
  </Algorithm>
- <Domain>
  - <ProcDomain sThmLayer="" iNumMaxObj="0" iVersion="4">
      <mClssFltr eState="0" bUnclsfy="0" bUseDmnTxt="1" />
    </ProcDomain>
  </Domain>
- <SubProc>
    <!-- Below is the Process Step "FISH Mamma 2D" 108 in FIG.15 -->
  - <ProcBase Name="fish mamma 2D" bLoopChg="0" iMaxCycle="1" bExpand="0"
      bActive="1" bAutoName="0" sComment="">
      <LensInfo tLcnsId="0" sPwd="" />
    + <Algorithm guid="A8BA5775-CC39-4194-9A6A-A64872EE1F81">
      - <Domain>
        + <ProcDomain sThmLayer="" iNumMaxObj="0" iVersion="1">
        </Domain>
      - <SubProc>
          <!-- Below is the Sub-Process Step "Image Border" 112 in
          FIG.15 -->
        + <ProcBase Name="image border" bLoopChg="0" iMaxCycle="1"
            bExpand="0" bActive="1" bAutoName="0" sComment="">
        + <ProcBase Name="foreground & background" bLoopChg="0"
            iMaxCycle="1" bExpand="0" bActive="1" bAutoName="0" sComment="">
        + <ProcBase Name="CENTROMER / CHROMOSOME 17" bLoopChg="0"
            iMaxCycle="1" bExpand="0" bActive="1" bAutoName="0" sComment="">
        + <ProcBase Name="clean up cells" bLoopChg="0" iMaxCycle="1"
            bExpand="0" bActive="1" bAutoName="0" sComment="">
        + <ProcBase Name="create temporary layer and object variables for
            CHR17" bLoopChg="0" iMaxCycle="1" bExpand="0" bActive="1"
            bAutoName="0" sComment="">
        + <ProcBase Name="HER2/NEU Signal" bLoopChg="0" iMaxCycle="1"
            bExpand="0" bActive="1" bAutoName="0" sComment="">
        + <ProcBase Name="true cell with Existence of sub objects
            Her2neu/signal (1) = 0 at Cell: cell without Her2/neu signal"
            bLoopChg="0" iMaxCycle="1" bExpand="1" bActive="1" bAutoName="1"
            sComment="">
        + <ProcBase Name="cell with Membership to true cell = 0 at Cell: cell"
            bLoopChg="0" iMaxCycle="1" bExpand="1" bActive="1" bAutoName="1"
            sComment="">
        - <ProcBase Name="cell with Existence of super objects true cell (1) =
            0 at CHR 17: cell" bLoopChg="0" iMaxCycle="1" bExpand="1"
            bActive="1" bAutoName="1" sComment="">
            <LensInfo tLcnsId="0" sPwd="" />
          - <Algorithm guid="3AC44F21-C6B2-4804-9929-BB18BE6F2051">
            - <Params>
                <DValue value="7" type="clssId" name="valClass" />
              </Params>
            </Algorithm>
          - <Domain>
```

FIG. 35C

```
      - <ProcDmnFtrLvl>
        - <ProcDomain sThmLayer="" iNumMaxObj="0" iVersion="4">
          - <mClssFltr eState="2" bUnclsfy="0" bUseDmnTxt="1">
            - <lClss>
  145 ─┐     - <DListInt>
              <int value="7" />
            </DListInt>
          </lClss>
        </mClssFltr>
        - <TermThrsh eCmpr="5" eBaseUnit="0">
          <PropDscrId GUID="7F30AE70-0DDD-483c-A693-
             7698C3CB96FF" InstID="Existence of super
             objects true cell (1)" />
          - <ProcVrblValUnit bUseProcVrbl="0">
              <DValue value="0." type="double" />
          </ProcVrblValUnit>
          - <ProcVrblValPxl bUseProcVrbl="0">
              <DValue value="0." type="double" />
          </ProcVrblValPxl>
        </TermThrsh>
      </ProcDomain>
      - <MapLvlProxy strName="CHR 17">
          <Scope GUID="00000000-0000-0000-0000-
             000000000000" />
      </MapLvlProxy>
    </ProcDmnFtrLvl>
  </Domain>
  <SubProc />
</ProcBase>
+ <ProcBase Name="loop: cell at CHR 17: <- cell" bLoopChg="1"
    iMaxCycle="1" bExpand="1" bActive="1" bAutoName="1" sComment="">
+ <ProcBase Name="create temporary layer and object variables for
    Her2/Neu" bLoopChg="0" iMaxCycle="1" bExpand="0" bActive="1"
    bAutoName="0" sComment="">
+ <ProcBase Name="STATISTIC 2D" bLoopChg="0" iMaxCycle="1"
    bExpand="0" bActive="1" bAutoName="0" sComment="">
+ <ProcBase Name="3 ebenen" bLoopChg="0" iMaxCycle="1" bExpand="0"
    bActive="1" bAutoName="0" sComment="">
+ <ProcBase Name="correct the prior results" bLoopChg="0"
    iMaxCycle="1" bExpand="0" bActive="1" bAutoName="0" sComment="">
  </SubProc>
</ProcBase>
<!-- Below is the Process Step "Rename Levels" 109 in FIG.15  -->
- <ProcBase Name="rename levels" bLoopChg="0" iMaxCycle="1" bExpand="0"
    bActive="1" bAutoName="0" sComment="">
  <LensInfo tLensId="0" sPwd="" />
+ <Algorithm guid="A8BA5775-CC39-4194-9A6A-A64872EE1F81">
+ <Domain>
+ <SubProc>
</ProcBase>
```

FIG. 35D

```xml
<!-- Below is the Process Step "Link Objects, Slices, Nuclei and
Signals" 110 in FIG.15  -->
- <ProcBase Name="LINK OBJECTS, LINK SLICES, LINK NUCLEI; LINK SIGNALS"
    bLoopChg="0" iMaxCycle="1" bExpand="1" bActive="1" bAutoName="0"
    sComment="">
    <LcnsInfo tLcnsId="0" sPwd="" />
  + <Algorithm guid="A8BA5775-CC39-4194-9A6A-A64872EE1F81">
  + <Domain>
  - <SubProc>
      <!-- Below is the Sub-Process Step "3D Processes" 113 in
      FIG.15  -->
    - <ProcBase Name="3D processes" bLoopChg="0" iMaxCycle="1"
        bExpand="1" bActive="1" bAutoName="0" sComment="">
        <LcnsInfo tLcnsId="0" sPwd="" />
      + <Algorithm guid="A8BA5775-CC39-4194-9A6A-A64872EE1F81">
      + <Domain>
      - <SubProc>
          <!-- Below is the Sub-Process Step "Prepare Slices"
          117 in FIG.15  -->
        - <ProcBase Name="prepare slices" bLoopChg="0" iMaxCycle="1"
            bExpand="0" bActive="1" bAutoName="0" sComment="">
            <LcnsInfo tLcnsId="0" sPwd="" />
          + <Algorithm guid="A8BA5775-CC39-4194-9A6A-
            A64872EE1F81">
          + <Domain>
          + <SubProc>
          </ProcBase>
          <!-- Below is the Sub-Process Step "Classify Slices"
          118 in FIG.15  -->
        - <ProcBase Name="Classify Slices and put small true NUCLEI
            away" bLoopChg="0" iMaxCycle="1" bExpand="1" bActive="1"
            bAutoName="0" sComment="">
            <LcnsInfo tLcnsId="0" sPwd="" />
          + <Algorithm guid="A8BA5775-CC39-4194-9A6A-
            A64872EE1F81">
          + <Domain>
          + <SubProc>
          </ProcBase>
        + <ProcBase Name="correcting some definitions" bLoopChg="0"
            iMaxCycle="1" bExpand="0" bActive="1" bAutoName="0"
            sComment="">
        + <ProcBase Name="cell at Level 4: true NUCLEI" bLoopChg="0"
            iMaxCycle="1" bExpand="1" bActive="1" bAutoName="0"
            sComment="">
      </SubProc>
    </ProcBase>
    <!-- Below is the Sub-Process Step "Find Overlap" 114 in
    FIG.15  -->
  - <ProcBase Name="find overlapp" bLoopChg="0" iMaxCycle="1"
      bExpand="0" bActive="1" bAutoName="0" sComment="">
      <LcnsInfo tLcnsId="0" sPwd="" />
```

FIG. 35E

```
+ <Algorithm guid="A8BA5775-CC39-4194-9A6A-A64872EE1F81">
+ <Domain>
- <SubProc>
  + <ProcBase Name="STEP 1: Classify Nuclei in slice-0"
      bLoopChg="0" iMaxCycle="1" bExpand="1" bActive="1"
      bAutoName="0" sComment="">
    <!-- Below is the Sub-Process Step "Link Nuclei Using
    Overlap Calculation" 119 in FIG.15   -->
    + <ProcBase Name="LINK NUCLEI USING OVERLAPP
        CALCULATION" bLoopChg="0" iMaxCycle="1" bExpand="0"
        bActive="1" bAutoName="0" sComment="">
  </SubProc>
</ProcBase>
<!-- Below is the Sub-Process Step "Some Corrections" 115 in
FIG.15   -->
- <ProcBase Name="some corrections" bLoopChg="0" iMaxCycle="1"
    bExpand="0" bActive="1" bAutoName="0" sComment="">
  <LensInfo tLensId="0" sPwd="" />
  + <Algorithm guid="A8BA5775-CC39-4194-9A6A-A64872EE1F81">
  + <Domain>
  + <SubProc>
</ProcBase>
<!-- Below is the Sub-Process Step "Help Processes" 116 in
FIG.15   -->
- <ProcBase Name="help processes" bLoopChg="0" iMaxCycle="1"
    bExpand="0" bActive="1" bAutoName="0" sComment="">
  <LensInfo tLensId="0" sPwd="" />
  + <Algorithm guid="A8BA5775-CC39-4194-9A6A-A64872EE1F81">
  + <Domain>
  + <SubProc>
</ProcBase>
+ <ProcBase Name="fusion background" bLoopChg="0" iMaxCycle="1"
    bExpand="0" bActive="1" bAutoName="0" sComment="">
+ <ProcBase Name="slide big at Level 4: Unclassified" bLoopChg="0"
    iMaxCycle="1" bExpand="1" bActive="1" bAutoName="1" sComment="">
  </SubProc>
</ProcBase>
<!-- Below is the Process Step "Statistics 3D" 111 in FIG.15   -->
- <ProcBase Name="STATISTICS 3D" bLoopChg="0" iMaxCycle="1" bExpand="0"
    bActive="1" bAutoName="0" sComment="">
  <LensInfo tLensId="0" sPwd="" />
  + <Algorithm guid="A8BA5775-CC39-4194-9A6A-A64872EE1F81">
  + <Domain>
  + <SubProc>
</ProcBase>
</SubProc>
</ProcBase>
</ProcessList>
<LensIds />
- <Behaviour>
  <DistCalc mode="CG" />
</Behaviour>
</eCog.Proc>
```

FIG. 35F

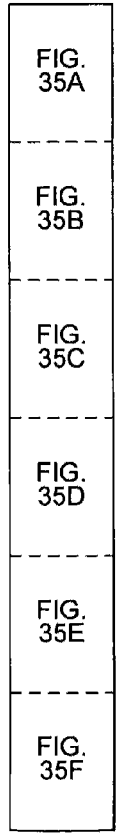

KEY TO FIG. 35

AUTOMATIC IMAGE ANALYSIS AND QUANTIFICATION FOR FLUORESCENCE IN SITU HYBRIDIZATION

CROSS REFERENCE TO RELATED APPLICATION

This application is a continuation of, and claims priority under 35 U.S.C. §120 from, nonprovisional U.S. patent application Ser. No. 11/607,557 entitled "Automatic Image Analysis and Quantification for Fluorescence in situ Hybridization," filed on Nov. 30, 2006, now U.S. Pat. No. 8,019,134, the subject matter of which is incorporated herein by reference.

TECHNICAL FIELD

The present invention relates generally to locating specified image structures in digital images, and more specifically to a computer-implemented system for automatically identifying and quantifying cellular structures marked using fluorescence in situ hybridization (FISH).

BACKGROUND

Systems for detecting and analyzing target patterns in digital imagery have a wide variety of uses. One such use is analyzing anatomical regions in radiological images. For example, systems for analyzing computed tomography (CT) images are used for the computer-aided detection of cancerous regions in human breasts and lungs. Another use for such image analysis systems is to detect and analyze target patterns in biomedical images obtained from microscopes, such as confocal microscopes. For example, pathologists use confocal microscopes to analyze cells and their components, such as organelles, membranes, nuclei, genes, chromosomes and macromolecules such as RNA, DNA, proteins and peptides. Such image analysis is used not only in diagnosis and prognosis relating to medical patients, but also in basic research, drug discovery and clinical trials.

Confocal microscopy offers several advantages over conventional optical microscopy by providing a wider depth of field, eliminating out-of-focus glare, and allowing the collection of serial optical sections from thick specimens. The laser scanning confocal microscope (LSCM) is currently the most widely used confocal microscope for biomedical research applications. In the biomedical sciences, a major application of confocal microscopy involves imaging cells and cell components that have been labeled with biomarkers, such as fluorescent probes. Confocal microscopy in combination with in situ hybridization and fluorescence techniques can be used to study DNA and RNA sequences in chromosomes and to analyze cell components, such as chromosomes and genes. One such technique for analyzing cell components is Fluorescence in situ Hybridization (FISH). For additional information on the FISH technique, see U.S. patent application Ser. No. 11/050,035, published on Dec. 1, 2005 as Publication No. 2005/0265588 A1, by Gholap et al. (the entirety of which is incorporated herein by reference).

In one specific application, FISH is used to analyze the Her-2/neural gene in breast biopsies in order to provide a diagnosis and prognosis for breast cancer. Using confocal microscopy in combination with FISH, a pathologist calculates the degree of gene amplification as the basis for the diagnosis. In one accepted diagnostic procedure, the pathologist analyzes a minimum of one hundred nuclei in order to calculate the degree of amplification. In this conventional procedure, the pathologist manually counts the marked chromosomes and genes (called "fluorescence signals") in each of the one hundred nuclei and then calculates the ratios of the genes to the chromosomes. A disadvantage of this conventional procedure is that even an experienced pathologist may miss some of the fluorescence signals due to fatigue and loss of concentration. Most of the biopsies contain normal counts of marked genes and chromosomes, and the pathologist may lose concentration with the tedium of counting genes and chromosomes in hundreds of nuclei in multiple biopsies. Moreover, determining whether a fluorescence signal represents a single gene or multiple overlapping genes based on the brightness and size of the fluorescence signal is often a subjective determination. Individual pathologists may have different counting styles.

Thus, an automated system for counting fluorescence signals obtained from the FISH technique is desired. Existing automated counting systems count fluorescence signals based on two-dimensional images. See, e.g., Gholap et al., Pub. No. 2005/0265588 A1, cited above. Even in existing systems that obtain three-dimensional information using confocal microscopy, however, the systems analyze two-dimensional images obtained by condensing the three-dimensional information, thereby losing much of the three-dimensional information. It is difficult to distinguish individual nuclei and other cell components in two-dimensional composite images obtained by condensing three-dimensional information. Fluorescence signals that touch or overlap other signals cannot be accurately counted. In addition, information concerning the distance between signals and the size of individual signals is lost. Thus, a system is sought for automatically counting fluorescence signals that are present in three dimensions in slides obtained using the FISH technique.

SUMMARY

An image analysis system extracts, segments, classifies, quantifies and counts three dimensional objects present in tissue, such as biopsy tissue of a breast cancer patient. The analysis system automatically analyzes and counts fluorescence signals present in the biopsy tissue marked using the Fluorescence in situ Hybridization (FISH) technique. The user of the system specifies classes of a class network and process steps of a process hierarchy. Then pixel values in image slices of the biopsy tissue are acquired in three dimensions. Each separate image slice of a z-stack is acquired at a different depth in the z-dimension of the biopsy tissue. A computer-implemented network structure is generated by linking pixel values of the image slices to objects of a data network according to the membership functions of the class network and the process steps of the process hierarchy.

Objects associated with pixel values at different depths of the biopsy tissue are used to determine the number, volume and distance between cell components. For example, the distance between genes and between a gene and the nuclear membrane can be determined. In one application, fluorescence signals that mark Her-2/neural genes and centromeres of chromosome seventeen are counted to obtain a diagnosis of breast cancer. Her-2/neural genes that overlap one another or that are covered by centromeres can be accurately counted. Signal artifacts that do not designate genes can be identified by their abnormal area or volume.

A method of automatically counting cellular components enhances the reliability and confidence of the FISH diagnostic technique. The method eliminates the human error associated with conventional manual diagnostic procedures using the FISH technique. Moreover, the method is more accurate than existing automated counting methods based on two-dimensional image analysis. The method enables the user quickly and easily to quantify the cellular components in hundreds of nuclei, in multiple regions of a slide, and in multiple slides of a biopsy. In addition, the method enables the analysis of slides from multiple biopsies. Consequently, the method delivers meaningful diagnostic support based on multiple biopsies, which cannot be provided by existing automated counting methods based on two-dimensional image analysis.

The method can also analyze images captured in multiple focal planes at multiple wavelengths using multiple biomarking techniques and spectral methods. For example, multiple images of the same biopsy tissue taken using a microscope, an X-ray device, a computer tomograph, an ultrasound imaging device, and a magnetic resonance imaging device can be analyzed and correlated. In addition, the same types of cell components in the various images can be labeled using different biomarkers. Objects that correspond to the same cell components in the various images are then linked, correlated, analyzed and counted. The diagnosis and prognosis of the patient is improved by correlating the results of the analysis of the various images taken using the different biomarkers and spectral analysis techniques.

In one specific embodiment, a software program receives a specification of a class network and a specification of a process hierarchy. Pixel values of an image that includes cell components marked using fluorescence in situ hybridization (FISH) are acquired. The software program then performs the process steps of the process hierarchy to generate a data network by linking selected pixel values of the image to objects. The objects are then classified according to the membership functions of each class and subclass of the class network. One of the classes corresponds to a particular type of marked cell component. The software program then counts the number of the particular type of marked cell component using the data network.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 34 is a listing of high-level lines of XML code corresponding to a Cognition Language script that implements a class network and a process hierarchy for analyzing and counting fluorescence signals present in biopsy tissue marked using the FISH technique.

FIGS. 35A-E show more lines of the XML code of FIG. 34.

DETAILED DESCRIPTION

Reference will now be made in detail to some embodiments of the invention, examples of which are illustrated in the accompanying drawings.

Figure 1:
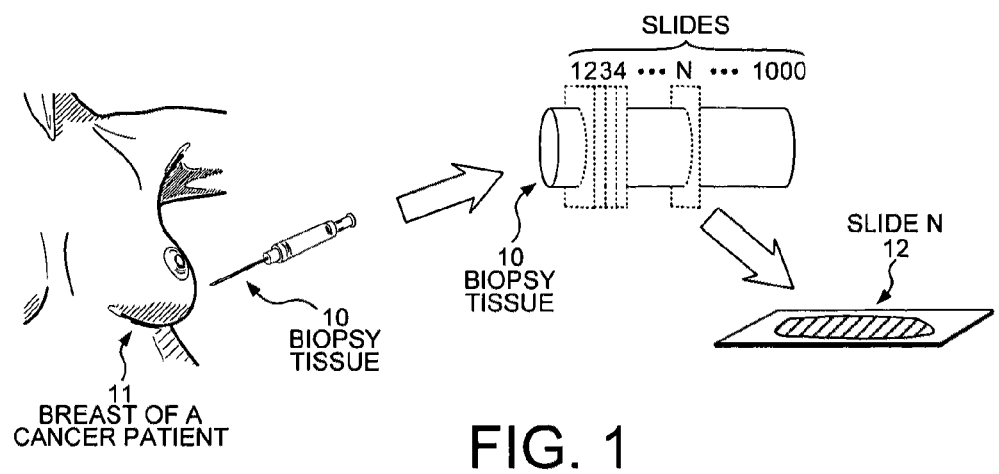
FIG. 1 is a diagram illustrating the process of analyzing nuclei from biopsy tissue of a human breast.

An analysis system is disclosed that automatically counts fluorescence signals present in biopsy tissue marked using the FISH technique. FIG. 1 illustrates the process of analyzing nuclei from biopsy tissue 10 taken from a human breast 11. First, the biopsy tissue 10 is extracted from one location in the breast 11 of the patient. Only one or just a few biopsy samples are taken partly because the biopsy procedure is painful. Taking many biopsy samples also damages the structure of the breast and is also typically avoided for both medical and aesthetic reasons. Under conventional analysis methods, only about one hundred nuclei of the biopsy tissue are manually analyzed. The novel automatic fluorescence signal counting system, however, enables the pathologist to analyze a very large number of nuclei and obtain a thorough understanding of the biopsy tissue. This is advantageous considering that only one biopsy tissue sample is typically taken from the breast 11. Conventional manual analysis methods do not achieve the best diagnostic and prognostic results because only a small number of nuclei from a single biopsy tissue sample of the patient's breast are analyzed. The analysis system, however, is able automatically to count an arbitrarily large number of cell components. The biopsy tissue sample is sliced and made into many slides, for example, up to one thousand slides. FIG. 1 shows the nth slide 12 of the one thousand slides.

Figure 2:
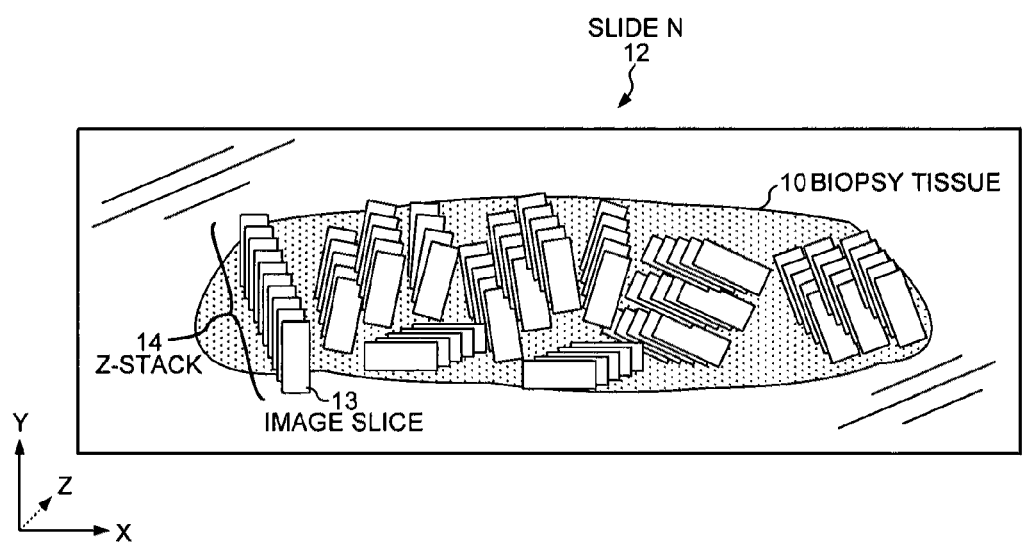
FIG. 2 shows a slide containing the biopsy tissue of FIG. 1.

FIG. 2 shows how the fluorescence signal counting system scans the biopsy tissue 10 on slide 12 at many locations. For example, the system can scan biopsy tissue on a typical slide at up to two hundred locations. At each location of the scans, the system generates multiple image slices at different depths of the z-axis. The multiple image slices are obtained using a confocal microscope. The stacks of image slices are called "z-stacks". FIG. 2 shows the top image slice 13 of a z-stack 14.

Figure 3:
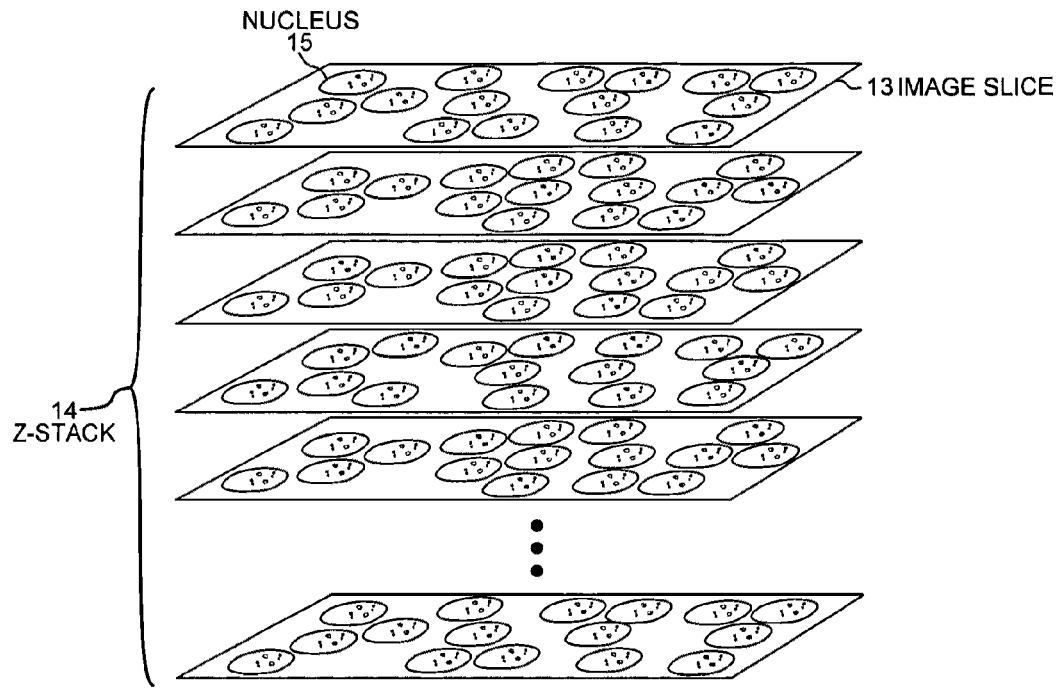
FIG. 3 is a diagram of multiple image slices taken from the slide of FIG. 2.

FIG. 3 shows the many nuclei apparent in each image slice of z-stack 14. Hundreds of nuclei are typically apparent in each image slice. For example, a non-cancerous nucleus 15 is one of the nuclei apparent in top image slice 13. In this embodiment of the system that counts fluorescence signals present in breast tissue marked using the FISH technique, identifying the cell components within each nucleus is of primary importance. Therefore, only the membranes of the nuclei are shown in FIG. 3, as opposed to the cell membranes.

Figure 4:
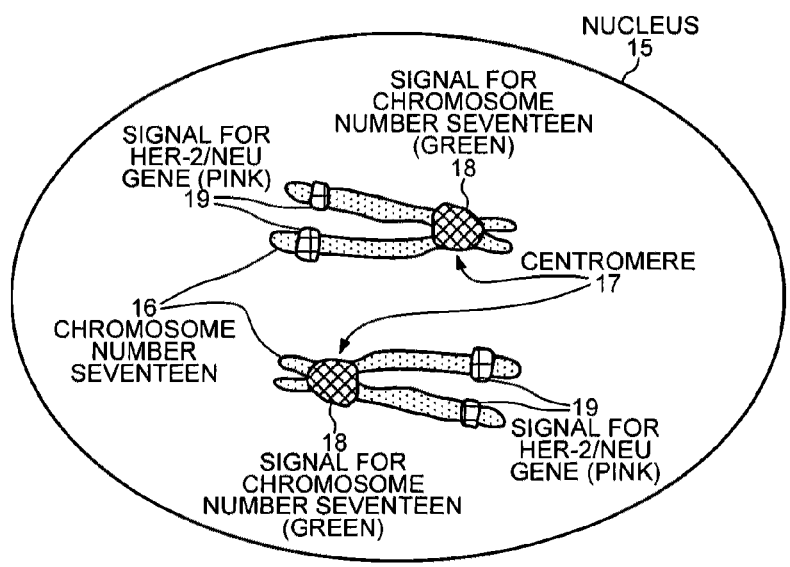
FIG. 4 is a diagram showing cell components in a nucleus from an image slice of FIG. 3.

FIG. 4 shows certain cell components of a non-cancerous nucleus 15, which has been stained with DAPI (4,6-diamidino-2-phenylindole). The cell components include centromeres and genes present on human chromosome number seventeen 16. In the FISH technique, fluorescence signals are emitted by the marked cell components. In this embodiment that is related to the diagnosis of breast cancer, genes present on chromosome number seventeen are analyzed. The nucleus of a normal cell typically contains two copies of chromosome number seventeen. Genes that are to be analyzed are marked in the FISH technique with fluorescent probes. The marked genes then appear as brightly colored areas when viewed with a fluorescent microscope. Various parameters of the marked genes are then determined, such as number, size, shape, distance between the marked genes and distance between a marked gene and the nuclear membrane. In this embodiment related to the diagnosis of breast cancer, the FISH technique is used to analyze the Her-2/neural (Human epidermal growth factor receptor-2) gene in breast biopsy tissue in order to provide a diagnosis and prognosis for breast cancer. In cancerous cells of the human breast, a high degree of amplification of the Her-2/neu gene produces an overexpression of the corresponding protein. Thus, detecting an amplification of the Her-2/neu gene and a corresponding overexpression of the Her-2/neu protein is an indication of a poor prognosis for mammary carcinoma. The diagnosis of metastatic breast cancer from Her-2/neu overexpression is all the more useful because of the development of drugs that directly target the Her-2/neu protein and are specially suited to combat this type of cancer, such as Trastuzumab (Herceptin). These anti-cancer drugs are quite expensive. By better diagnosing this particular type of cancer, medical costs can be saved by administering these expensive drugs only to those cancer patients who have this particular type of cancer. In addition, by detecting the amplification of genes other than Her-2/neu, the analysis system supports the administration of personalized medication when new drugs are developed. Finally, personalized dosages based on a particular patient's biopsy tissue can also be administered.

The degree of amplification is determined by the ratio of the number of fluorescence signals from the Her-2/neu gene to the number of fluorescence signals that mark the centromere of each chromosome number seventeen on which the Her-2/neu genes are located. FIG. 4 shows two copies of chromosome number seventeen 16. In FIG. 4, each chromosome number seventeen 16 has two Her-2/neu genes and one centromere 17. By convention, the Her-2/neu genes that are marked with the fluorescent probe LSI-HER-2/neu are made to appear pink or orange colored when viewed with a fluorescent microscope. The microscopic images are acquired in the gray scale and are then colorized using accepted conversions into the RGB scale for ease of viewing. Each centromere 17 of chromosome number seventeen that is marked with the fluorescent probe CEP-17 typically appears green. FIG. 4 shows two green fluorescence signals 18, each indicative of one copy of chromosome number seventeen 16. A pink fluorescence signal 19 illuminates chromosome number seventeen 16 at each location of the Her-2/neu gene. In a non-cancerous cell, there is typically one Her-2/neu gene on each chromosome number seventeen 16. The Her-2/neu gene is considered not to be amplified when each chromosome number seventeen 16 has only one Her-2/neu gene. The Her-2/neu gene is highly amplified where there are more than four Her-2/neu genes on each chromosome number seventeen 16.

In one accepted diagnostic procedure, one hundred nuclei of a biopsy tissue sample are analyzed in order to calculate the degree of amplification of the Her-2/neu gene in the biopsy tissue sample. In each of the one hundred nuclei, the fluorescence signals from each Her-2/neu gene and each chromosome number seventeen are counted. The degree of amplification of the biopsy tissue sample is then categorized as being (i) not amplified, (ii) moderately amplified or (iii) highly amplified based on the following criteria. The sample is not amplified if less than ten percent of the nuclei have more than four signals 19 indicative of the Her-2/neu gene. The sample is highly amplified if more than ten percent of the nuclei have more than ten signals 19 indicative of the Her-2/neu gene. And the sample is moderately amplified if more than ten percent of the nuclei have both (i) more than four but less than or equal to ten signals 19, and (ii) a quotient of signals 19 to signals 18 (indicative of chromosome number seventeen) of greater than two. For additional information on diagnostic procedures based on counting signals indicative of the Her-2/neu gene, see Pauletti et al., "Detection and quantitation of HER-2/neu gene amplification in human breast cancer archival material using fluorescence in situ hybridization," Oncogene, 13:63-72, Jul. 4, 1996, which is incorporated herein by reference. For different types of cancer, and even for different types of breast cancer, the ranges for the degrees of amplification differ.

In another accepted diagnostic procedure for the type of breast cancer that responds to Trastuzumab (Herceptin), the fluorescence signals from each Her-2/neu gene and each chromosome number seventeen in one hundred nuclei are also counted. The ratio of Her-2/neu fluorescence signals 19 to chromosome number seventeen fluorescence signals 18 for each nucleus is then calculated. Finally, the average of the ratios is calculated. The pathologist uses the average of the ratios to develop a diagnosis of breast cancer.

There are, however, complicating factors that have hindered conventional counting methods from obtaining an accurate count of the number of Her-2/neu fluorescence signals 19 per nucleus. The novel automatic fluorescence signal counting system overcomes these complicating factors. For example, the analysis system operates as a computer program and is not prone to fatigue and loss of concentration. Moreover, the system recognizes when the components of a nucleus have already been counted and does not recount that nucleus, which would result in a double count. In addition, by recognizing which nuclei have already been counted, not-yet-counted nuclei are not missed. Most important, the system can determine whether a fluorescence signal represents a single gene or multiple overlapping genes. The system can also distinguish bright spots on the image slices that are artifacts and not fluorescence signals at all.

Figure 5:
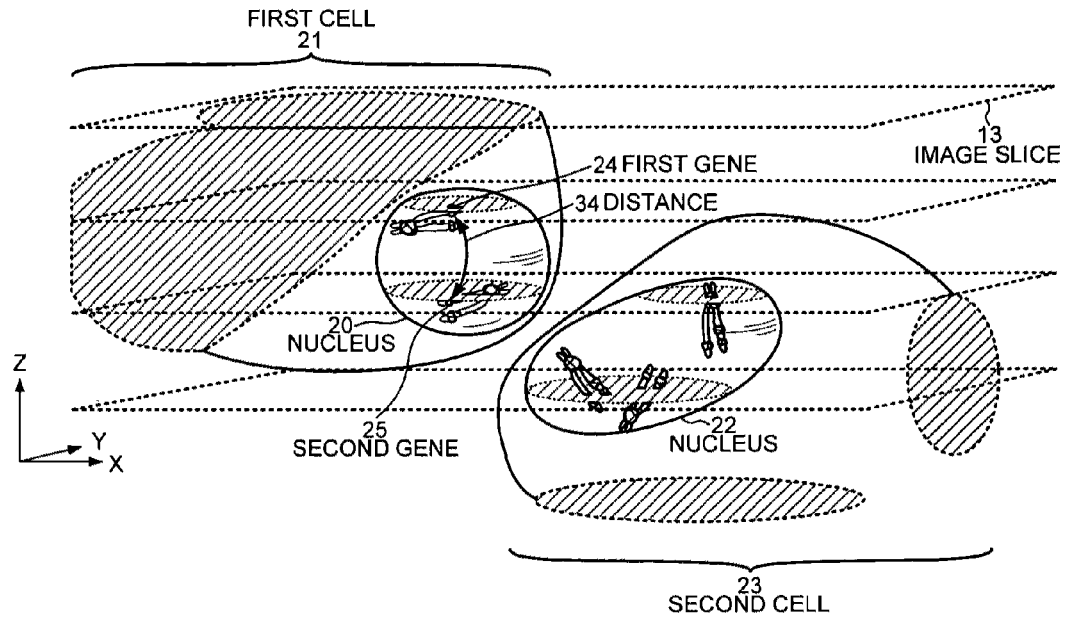
FIG. 5 is a three-dimensional diagram of cell components that are to be counted.

FIG. 5 illustrates how the three-dimensional nature of the cell components complicates the counting and can lead to incorrect results in conventional methods that count based on two-dimensional images and two-dimensional composites of three-dimensional information. The cells, nuclei and cell components of the biopsy tissue are present at different depths of the z-dimension in each slide. A fluorescence signal from a first gene that lies directly above a second gene in the z-dimension will overlap any fluorescence signal from the second gene. The signal from the second gene will go unnoticed in a two-dimensional image in the x-y plane. In addition, the signal from a centromere will cover up the signal from a gene that lies directly below the centromere.

FIG. 5 shows a nucleus 20 in a first cell 21, as well as a nucleus 22 in a second cell 23. Most of nucleus 20 of first cell 21 is at a higher depth in the z-stack than is nucleus 22 of second cell 23. The analysis system has generated three image slices of z-stack 14 that cut through the nuclei of first cell 21 and second cell 23. Nucleus 20 includes a first gene 24 that overlaps a lower-lying second gene 25.

Figure 6:
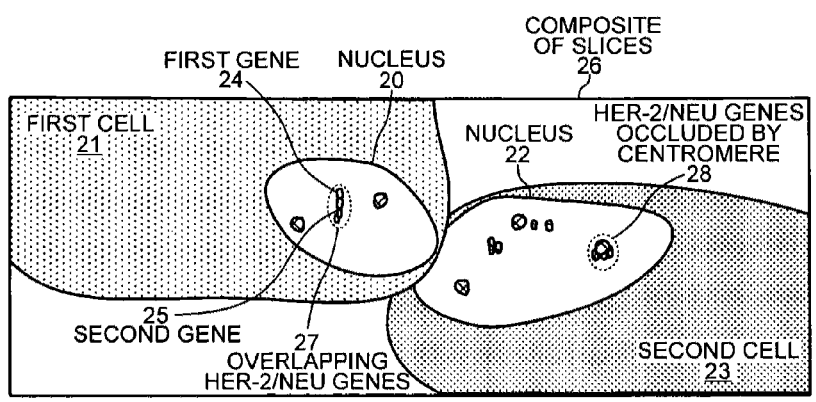
FIG. 6 is a two-dimensional composite diagram of the multiple image slices of the three-dimensional diagram of FIG. 5.

FIG. 6 illustrates how the cell components of first cell 21 and second cell 23 of FIG. 5 would look when viewed from above in only two dimensions. FIG. 6 shows a composite 26 of the image slices of FIG. 5. In this view, the Her-2/neu fluorescence signals 19 emanating from nucleus 20 partially overlap each other. Thus, from the x-y perspective, there are overlapping Her-2/neu genes 27. FIG. 6 also shows Her-2/neu genes 28 that are partially covered by a centromere. The analysis system is able accurately to count the Her-2/neu genes because the analysis system generates a data network based on the pixel values of multiple slices in the z-dimension.

Figure 7A:
FIGS. 7A-C show actual microscopic images of nuclei, genes and centromeres that are counted by the analysis system according to the invention.
Figure 7B:
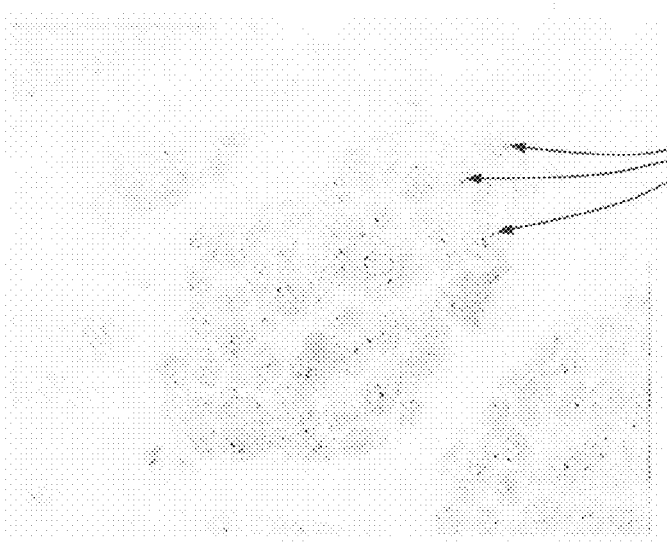
Figure 7C:
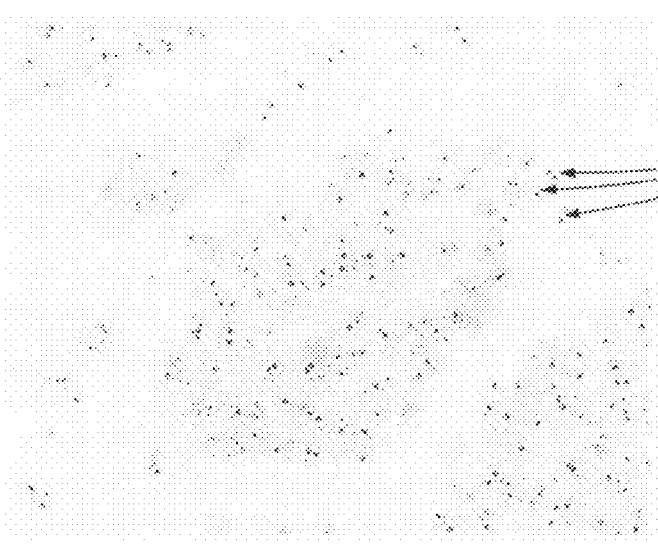

FIGS. 7A-C show actual microscopic images of nuclei, as well as genes and centromeres within the nuclei. FIG. 7A is a digital image acquired using a blue light channel to emphasize the stained nuclear membranes. Even using a blue light channel, it is difficult using conventional counting methods to distinguish the multiple overlapping nuclei from one another in FIG. 7A. FIG. 7B is a digital image acquired using a red light channel to emphasize the pink Her-2/neu fluorescence signals 19. FIG. 7C is a digital image acquired using a green light channel to emphasize the green chromosome number seventeen fluorescence signals 18. FIGS. 7B and 7C illustrate the difficulty in using conventional counting methods to determine which Her-2/neu genes and which chromosomes number seventeen fall within each particular nucleus of FIG. 7A. From the two-dimensional z-y perspective of FIG. 7B, for example, it is difficult to determine the depth of each pink Her-2/neu fluorescence signal 19 and therefore to identify the nucleus to which each Her-2/neu gene belongs.

Figure 8:
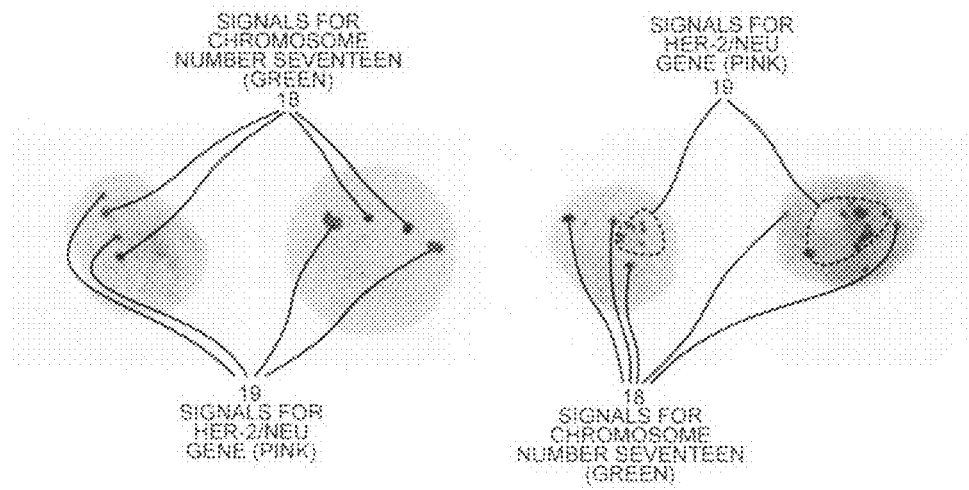
FIG. 8 is a microscopic images of nuclei containing green fluorescence signals that mark the centromeres of chromosome number seventeen and pink Her-2/neu fluorescence signals.

FIG. 8 shows actual microscopic images of nuclei containing green fluorescence signals 18 that mark the centromeres of chromosome number seventeen and pink Her-2/neu fluorescence signals 19. The left most nucleus is from a non-cancerous cell. The nucleus has two green fluorescence signals 18 and two pink Her-2/neu fluorescence signals 19. The two green signals 18 indicate the presence of two copies of chromosome number seventeen. The two pink signals 19 indicate the presence of two copies of Her-2/neu genes in the same nucleus. Thus, the ratio of Her-2/neu genes to chromosome number seventeen is 1.0, and the Her-2/neu gene is not amplified. The two nuclei on the right of FIG. 8 are from cancerous cells; each has clumps of overlapping pink Her-2/neu fluorescence signals 19 that are difficult to distinguish from one another in the x-y perspective. The second nucleus from the right has three green signals 18 and approximately 13 pink signals 19. The ratio of Her-2/neu genes to chromosome number seventeen is therefore approximately four, indicating that the Her-2/neu gene is highly amplified.

Figure 9:
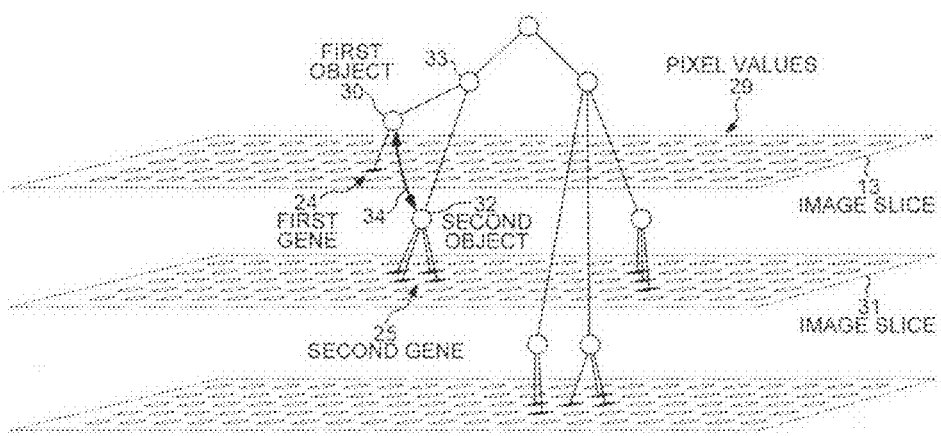
FIG. 9 is a schematic diagram representing part of a data network based on pixel values from the three image slices of FIG. 5 that cut through the two nuclei.

FIG. 9 is a diagram that represents part of a data network based on pixel values 29 of the three image slices of FIG. 5 that cut through first cell 21 and second cell 23. The pixel values of top image slice 13 that depict first gene 24 are linked to a first object 30. The pixel values of a lower image slice 31 that depict second gene 25 are linked to a second object 32. Both first object 30 and second object 32 are linked to a superordinated object 33. By linking objects obtained from image slices at different depths of the z-dimension, additional information can be extracted from the biopsy tissue 10 than would be available by analyzing images of the tissue only from the x-y perspective. For example, a distance 34 between first gene 24 and second gene 25 can be determined. The distance 34 between first gene 24 and second gene 25 is also illustrated in FIG. 5. In addition, the volume of a cell component that intersects multiple image slices can also be determined.

Objects associated with pixel values on the same image slice can also be linked. Objects can be linked not only based on their relative positions on the image slice. For example, objects that represent similar nuclei can be linked, such as nuclei with similar areas, shapes or brightnesses. Nuclei can be linked based on their concavity or convexity, for example. This would permit all Her-2/neu genes located in nuclei having a similar shape to be linked. Then the analysis system performs a specific algorithm on all of the linked genes. In another example, the distance between nuclei in one image slice is determined by linking nuclei objects in that level. Where the distance is determined to be small because the nuclei are clustered, the analysis system can apply a more extensive algorithm in the z-dimension to separate and distinguish the nuclei from one another. In yet another example, the area or volume of a gene signal relative to the area or volume of the associated nucleus can be determined by linking objects from the same image slice as well as from different levels.

The novel automatic fluorescence signal counting system generates not only a data network based on pixel values of image slices, but also a class network and a process hierarchy. The class network defines the characteristics of objects that that will be classified as various cell components. The process hierarchy includes process steps that control the flow of the analysis and calculations performed on the pixel values and objects.

Figure 10:
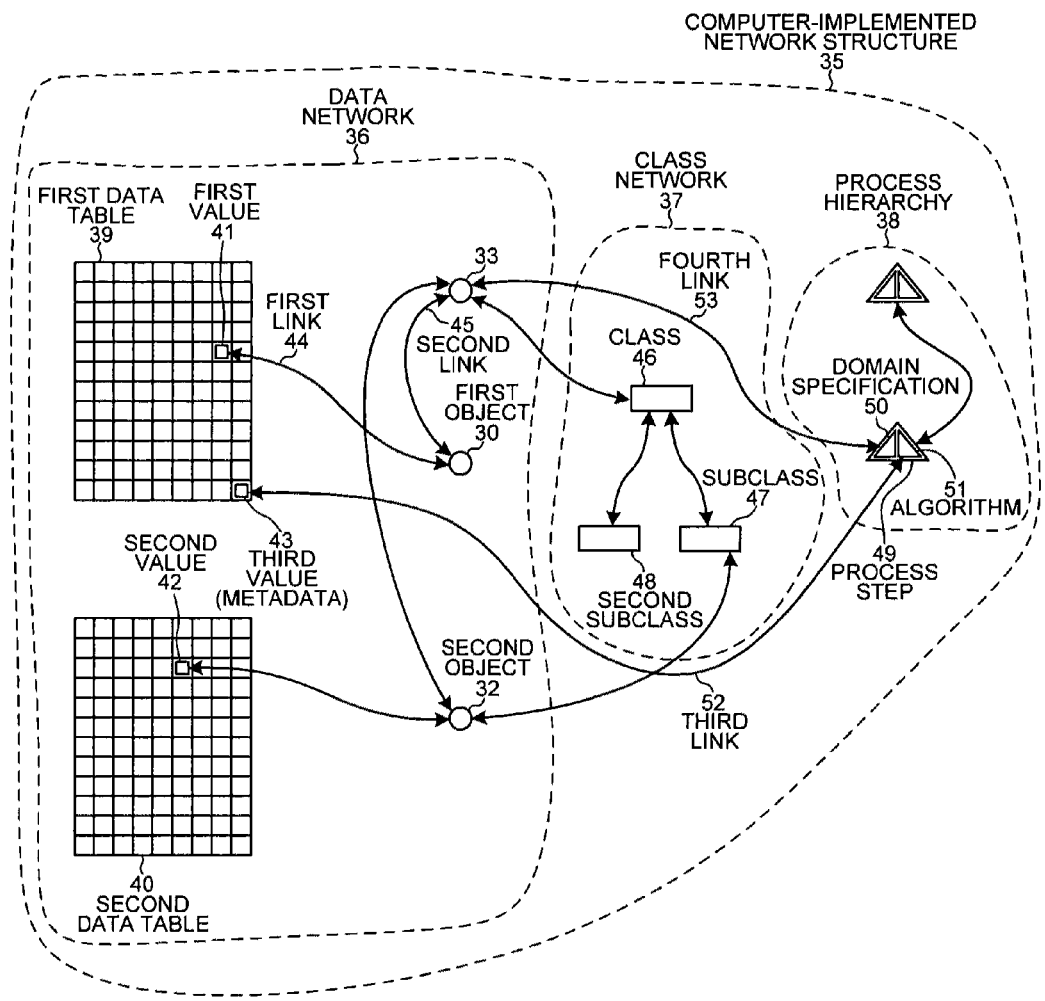
FIG. 10 is a simplified schematic diagram of a computer-implemented network structure that includes a data network, a class network and a process hierarchy.

FIG. 10 is a simplified diagram of a computer-implemented network structure 35 used by the analysis system to count and analyze fluorescence signals obtained using the FISH technique. Network structure 35 is generated by the analysis system and an associated computer program. The associated computer program is called the Cognition Program. The network structure 35 includes a data network 36, a class network 37 and a process hierarchy 38. In the example of FIG. 10, data network 36 includes a first data table 39 and a second data table 40. The table data values in data tables 39-40 are in the form of both numbers and text.

In this embodiment, some of the table data values are digital pixel values from image slices of biopsy tissue 10, while other table data values describe the patient from whom the biopsy was taken. Thus, some of the table data values are floating-point values representing the spectral intensity of individual pixels of the image slices. The other table data values are items of metadata relating to whether the patient might have breast cancer. Examples of such information include the patient's gender, age, weight, height, blood values, prescribed medications, number of children, family history of ailments, whether the patient breast-fed her children, whether the patient smoked or used drugs. In FIG. 10, a first value 41 and a second value 42 are spectral intensity values from the image slices, whereas a third value 43 is an item of metadata, such as the weight of the patient. In this example, the pixel values of first data table 39 correspond to the top image slice 13, and first value 41 corresponds to a pixel value of image slice 13 that depicts first gene 24. Similarly, the pixel values of second data table 40 correspond to the next lower image slice 31, and second value 42 corresponds to a pixel value of image slice 31 that depicts second gene 25.

In this embodiment, network structure 35 is used by the analysis system to count nuclei and other cell components. The visual inspection of slides and the manual counting of cell components is time consuming and labor intensive. Because of the low prevalence of fluorescence signals from highly amplified Her-2/neu genes in most of the slides viewed by the pathologist, tedium can cause the pathologist to overlook highly amplified Her-2/neu genes when they are present. Network structure 35 and the analysis system that generates network structure 35 help the pathologist to avoid overlooking and miscounting Her-2/neu genes.

Figure 11:
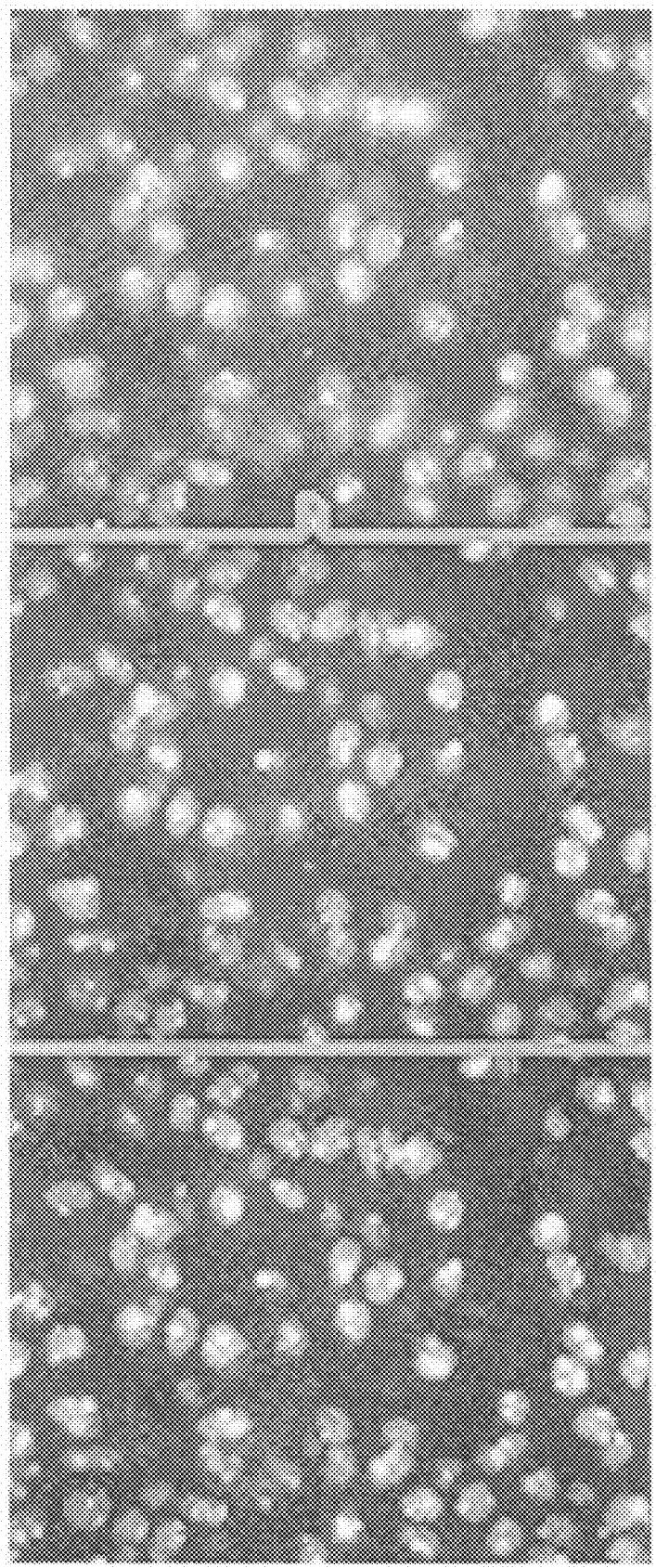
FIG. 11 shows digital image slices at various depths of a slide containing biopsy tissue.

FIG. 11 is an example of image slices that are analyzed by network structure 35 and the Cognition Program. For example, the three image slices of FIG. 11 are analogous to the three image slices of FIG. 9. The top image slice of FIG. 11 corresponds to first data table 39, and the middle image slice of FIG. 11 corresponds to second data table 40. In other embodiments, second data table 40 also includes metadata relating to the patient. Network structure 35 is used to identify and count cell components, such as nuclear membranes, centromeres and genes. To identify these three cell components, the analysis system filters out separate wavelengths of light that make up each image slice. The image data is typically acquired in a gray scale and then interpreted into an RGB scale by convention. Color schemes other than red-green-blue can also be used, for example, the hue-saturation-brightness (HSB) color scheme. For example, Her-2/neu fluorescence signals 19 could be interpreted as yellow instead of pink. In this example, nuclear membranes are most apparent in the gray scale corresponding to blue light; the marked centromeres of chromosome number seventeen are most apparent through a green filter; and the pink Her-2/neu fluorescence signals 19 pass through a red filter. Thus, for each image slice, the analysis system generates a pink image slice showing the Her-2/neu genes, a green image slice showing the centromeres of each chromosome number seventeen, and a blue image slice showing the membranes of the nuclei. The analysis system links the pixel values of the pink image slice to objects classified in the class hierarchy as genes. Pixel values of the green image slice are linked to objects classified as centromeres, and pixel values of the blue image slice are linked to objects classified as nuclear membranes.

Figure 12:
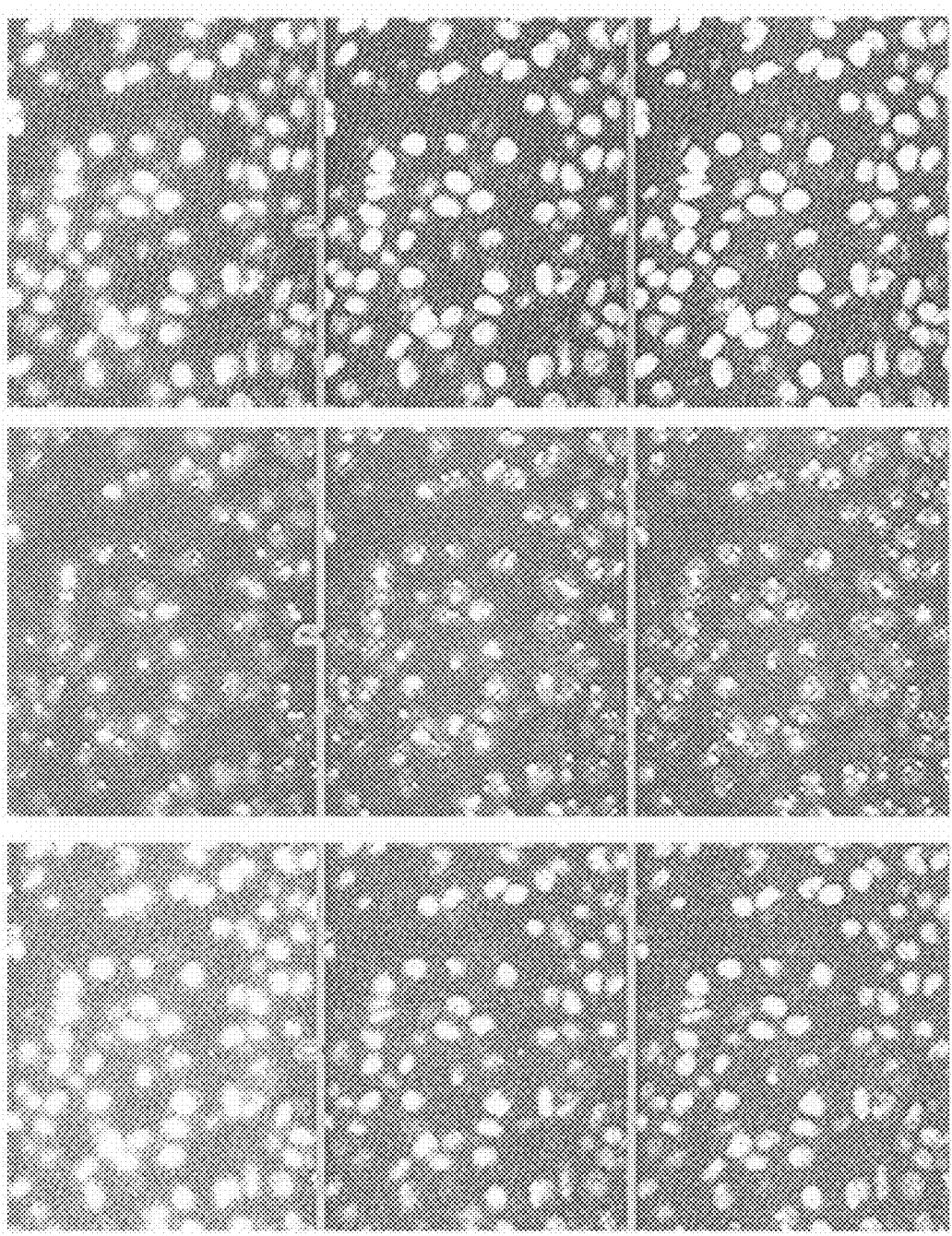
FIG. 12 shows the red, green and blue image slice components that make up the image slices of FIG. 11.

FIG. 12 shows the red, green and blue image slice components that make up the image slices of FIG. 11. On the left of FIG. 12, three red image slices show pink Her-2/neu fluorescence signals 19. In the middle of FIG. 12, green image slices show green fluorescence signals 18 indicative of chromosome number seventeen. On the right of FIG. 12, blue image slices show the membranes of the nuclei that contain the chromosomes with the Her-2/neu genes.

Returning to FIG. 10, data network 36 also includes objects and links. In this example, first value 41 is linked by a first link 44 to first object 30. First object 30 in FIG. 10 corresponds to first object 30 in FIG. 9. Second value 42 is linked to second object 32. First object 30 is linked by a second link 45 to object 33. Second object 32 is also linked to object 33. Class network 37 includes a class 46, a subclass 47 and a second subclass 48. Class 46 is linked to subclass 47 and to second subclass 48. In addition, class 46 of class network 37 is linked to object 33 of data network 36. In this example, class 46 is the class for Her-2/neu genes. And subclass 47 is linked to second object 32. In this example, subclass 47 is the class for Her-2/neu genes that are overlapped by other genes. Process hierarchy 38 includes a process step 49. Process step 49 in turn includes a domain specification 50 and an algorithm 51. Algorithm 51 is linked by a third link 52 to the third value 43 of first data table 39. Domain specification 50 is linked by a fourth link 53 to the object 33. Thus, an algorithm of a process step in process hierarchy 38 is linked to metadata in data network 36, and a domain specification of a process step in process hierarchy 38 is linked to an object in data network 36.

Figure 13:
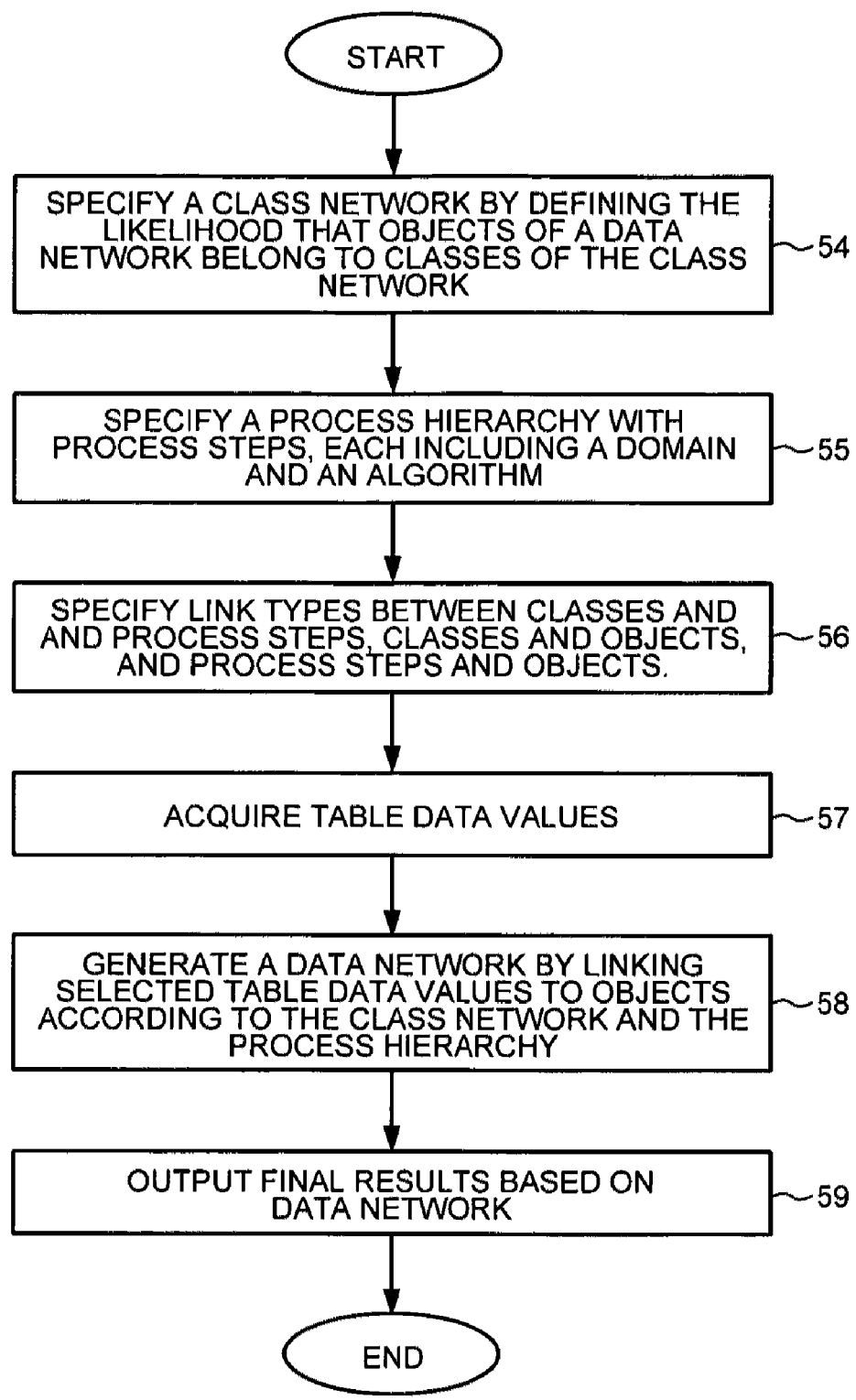
FIG. 13 is a flowchart of steps for analyzing and counting cell components using the computer-implemented network structure of FIG. 10.

FIG. 13 is a flowchart illustrating steps 54-59 of a method by which the analysis system uses network structure 35 and the Cognition Program to perform computer-aided detection (CAD) of cell components that the analysis system then counts. In other embodiments described below, network structure 35 is used to detect objects other than cell components. The steps of FIG. 13 will now be described in relation to the operation of network structure 35 of FIG. 10.

In first step 54, a user of the analysis system specifies class network 37 by defining the likelihood that objects of data network 36 will belong to each particular class of class network 37. The user of the analysis system is, for example, a research doctor who is applying his expert knowledge to train the analysis system in a specification mode. Such a research doctor could be a research pathologist working at a pharmaceutical company, for example. In addition to the research doctor, pathologists then also use the analysis system in an execution mode.

Figure 14:
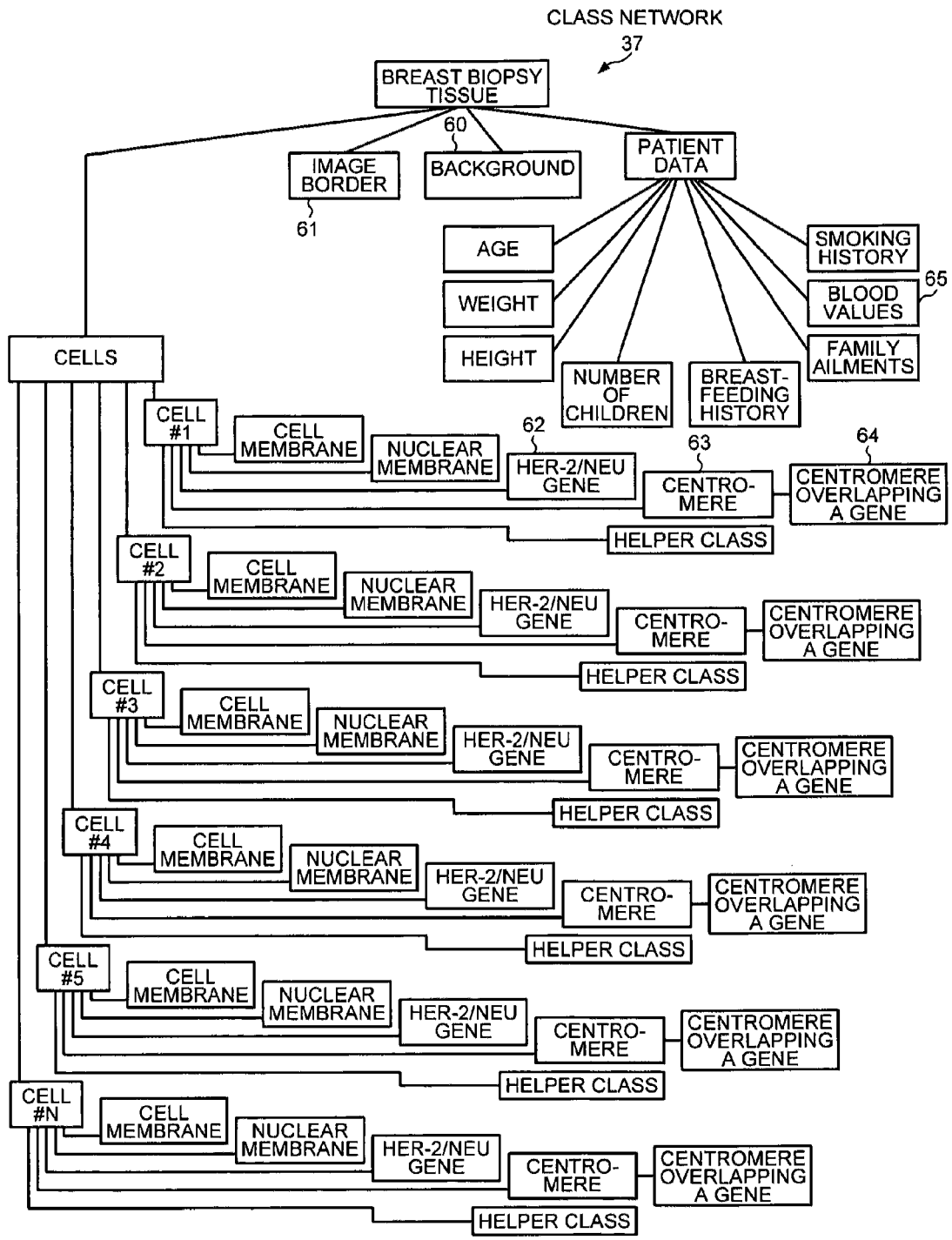
FIG. 14 is a diagram showing the class network of FIG. 10 in more detail.

FIG. 14 shows class network 37 of FIG. 10 in more detail. Class network 37 includes classes linked to subclasses that describe what the user expects to find in the image slices included in first data table 39 and second data table 40. Thus, in this example, the classes and subclasses of FIG. 14 describe what the user expects to see in the image slices of FIG. 11. The user starts by giving each class a name. In this example, the user has specified a background class 60, an image border class 61 and a separate class for each of the N cells having a nucleus that is to be counted. For example, cell number one has a subclass 62 for the Her-2/neu genes of the cell that are marked with pink Her-2/neu fluorescence signals 19. Cell number one also has a subclass 63 for green fluorescence signals 18 that mark the centromeres of chromosome number seventeen of the cell. The user has also given subclass 63 its own subclass 64 for those centromeres that overlap Her-2/neu genes. The user specifies a helper class to categorize cell components whose identity is unknown at the beginning of the analysis.

The user also specifies categories of metadata. In this example, class network 37 includes a class for patient data and subclasses specifying the types of patient data. The user has specified subclasses for the patient's age, weight, height, number of children, whether the patient breast-fed her children, the patient's family history of ailments, the patient's blood values 65, and whether the patient smoked.

Each class may have an associated membership function that defines the probability that an object of data network 36 will belong to the particular class. The membership functions do not define whether an individual pixel value belongs to a class. Rather, each object is a group of pixels linked to the object, and the user specifies the membership function by defining the properties that the object must have to belong to the class. Examples of such properties include the area, shape, color and texture of the object. The area of an object may be determined, for example, by the number of pixels linked to the object. An item of metadata may also be a variable in a membership function. For example, the texture of an object that belongs to the class "nuclear membrane" may be different if the age and weight of the patient are over certain thresholds.

Figure 15:
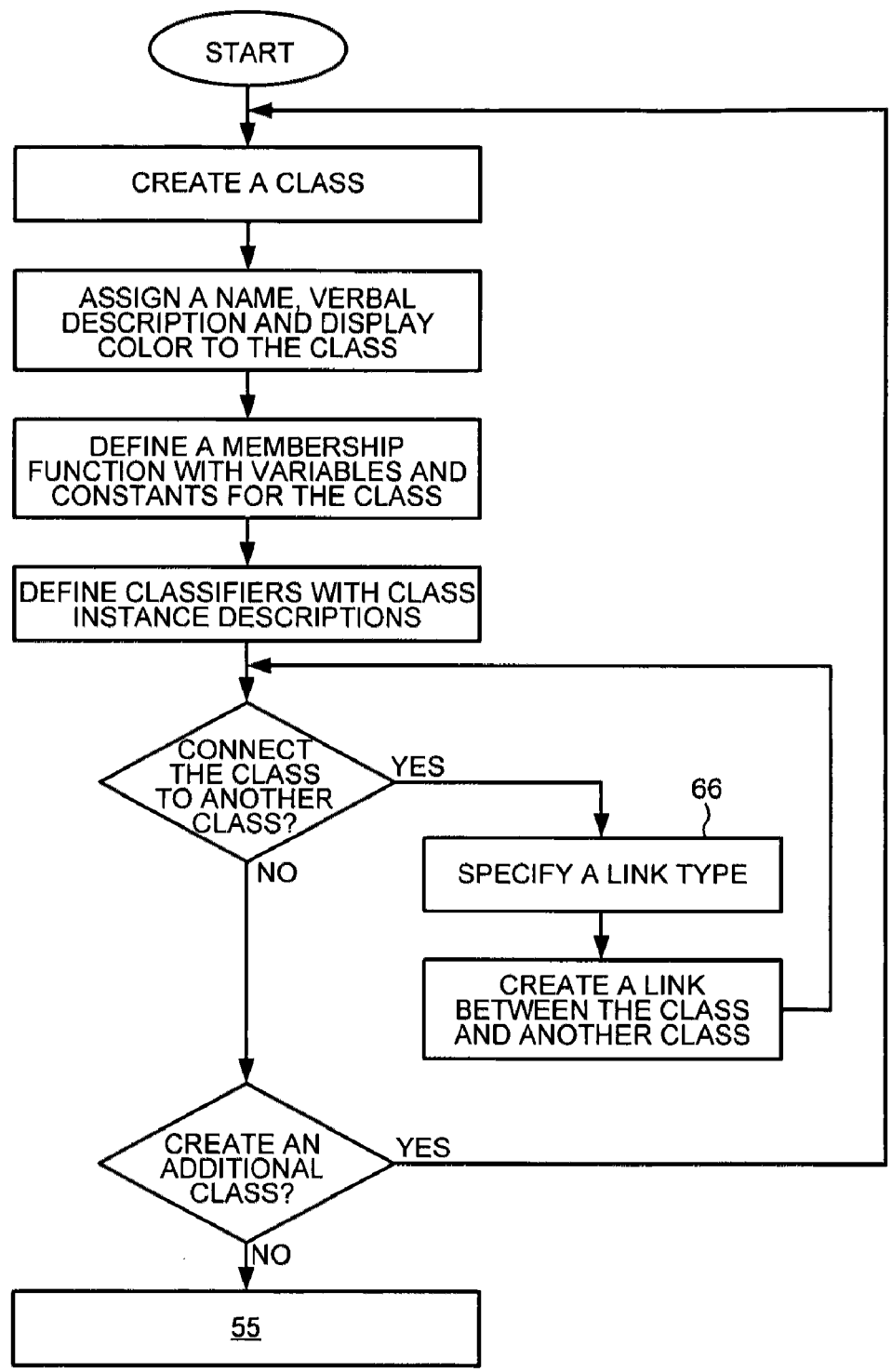
FIG. 15 is a flowchart showing the substeps of the first step of FIG. 13 for specifying the class network of FIG. 10.

FIG. 15 is a flowchart that illustrates the substeps of step 54 of FIG. 13 in more detail. In a substep 66, a link type for a link between two classes or subclasses is specified. Links that are not specified in substep 66 can also be specified later in step 56 of FIG. 13.

In step 55 of FIG. 13, the user specifies process hierarchy 38 of FIG. 10. The user specifies not only the individual process steps, but also the order in which the process steps are to be executed in the execution mode of the analysis system. Thus, each process hierarchy has a root process step linked to other process steps. The process steps in turn may be linked to substeps.

Figure 16:
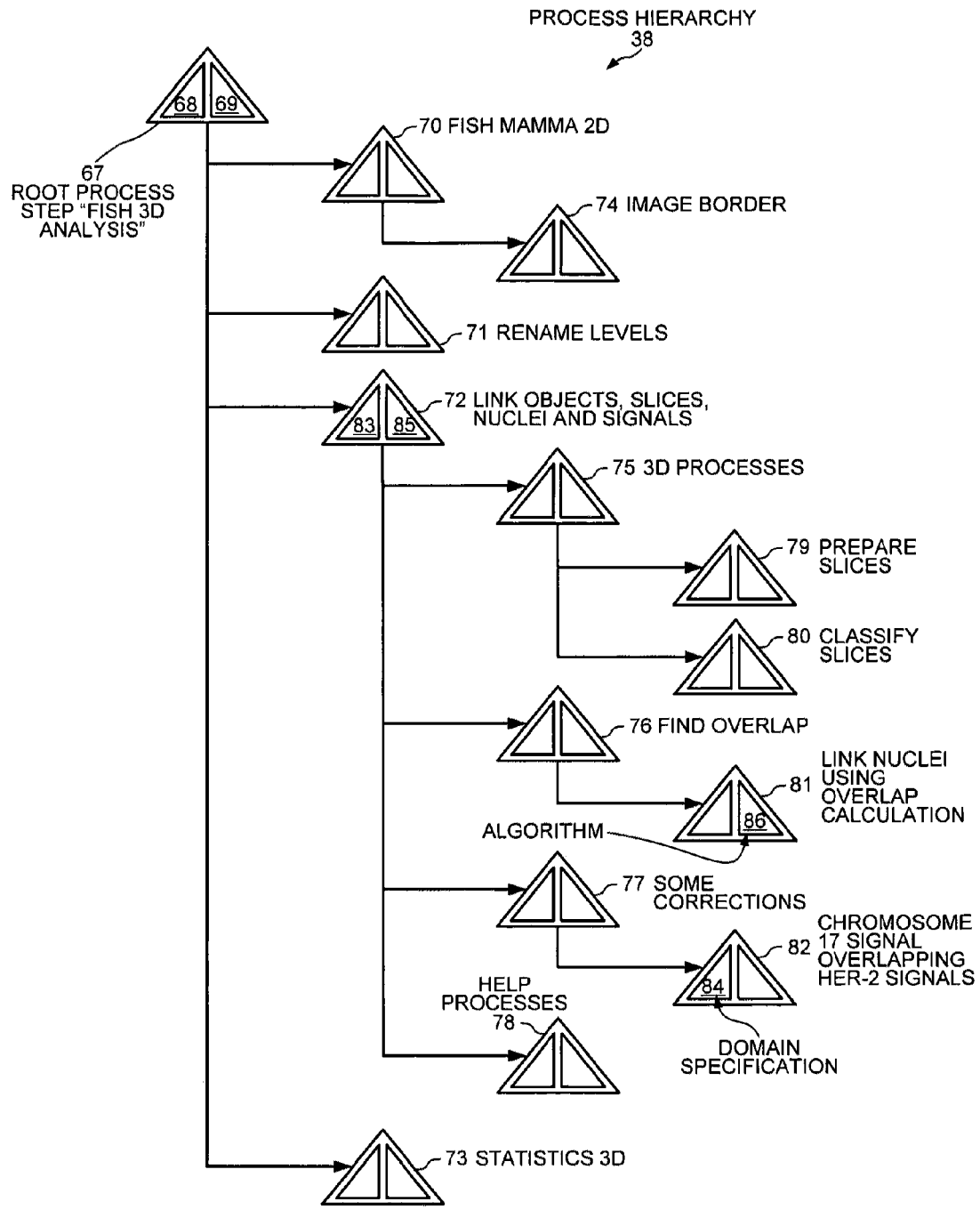
FIG. 16 is a diagram showing the process hierarchy of FIG. 10 in more detail.

FIG. 16 shows process hierarchy 38 of FIG. 10 in more detail. Process hierarchy 38 includes a root process step 67 named "FISH 3D Analysis" with a domain specification 68 and an algorithm 69. In this example, the user has specified four process steps 70-73 linked in a specific order to root process step 67. The first process step 70 "FISH Mamma 2D" has a sub-process step 74 named "Image Border". The third process step 72 "Link Objects, Slices, Nuclei and Signals" has four sub-process steps 75-78, three of which have their own substeps. Substep 75 "3D Processes" has a first substep 79 named "Prepare Slices" and a second substep 80 "Classify Slices". Substep 76 "Find Overlap" has a substep 81 named "Link Nuclei Using Overlap Calculation". Substep 77 "Some Corrections" has a substep 82 named "Chromosome 17 Signal Overlapping Her-2 Signals".

For each process step or sub-process step, the user has the option of specifying a domain and an algorithm. FIG. 16 shows that the user has specified a domain 83 for the process step 72 and a domain 84 for the sub-process step 82. The domain specifies classes that define the objects of data network 36 upon which the algorithm is to operate at run time in the execution mode. FIG. 16 also shows that the user has specified an algorithm 85 for the process step 72 and an algorithm 86 for the sub-process step 81.

Figure 17:
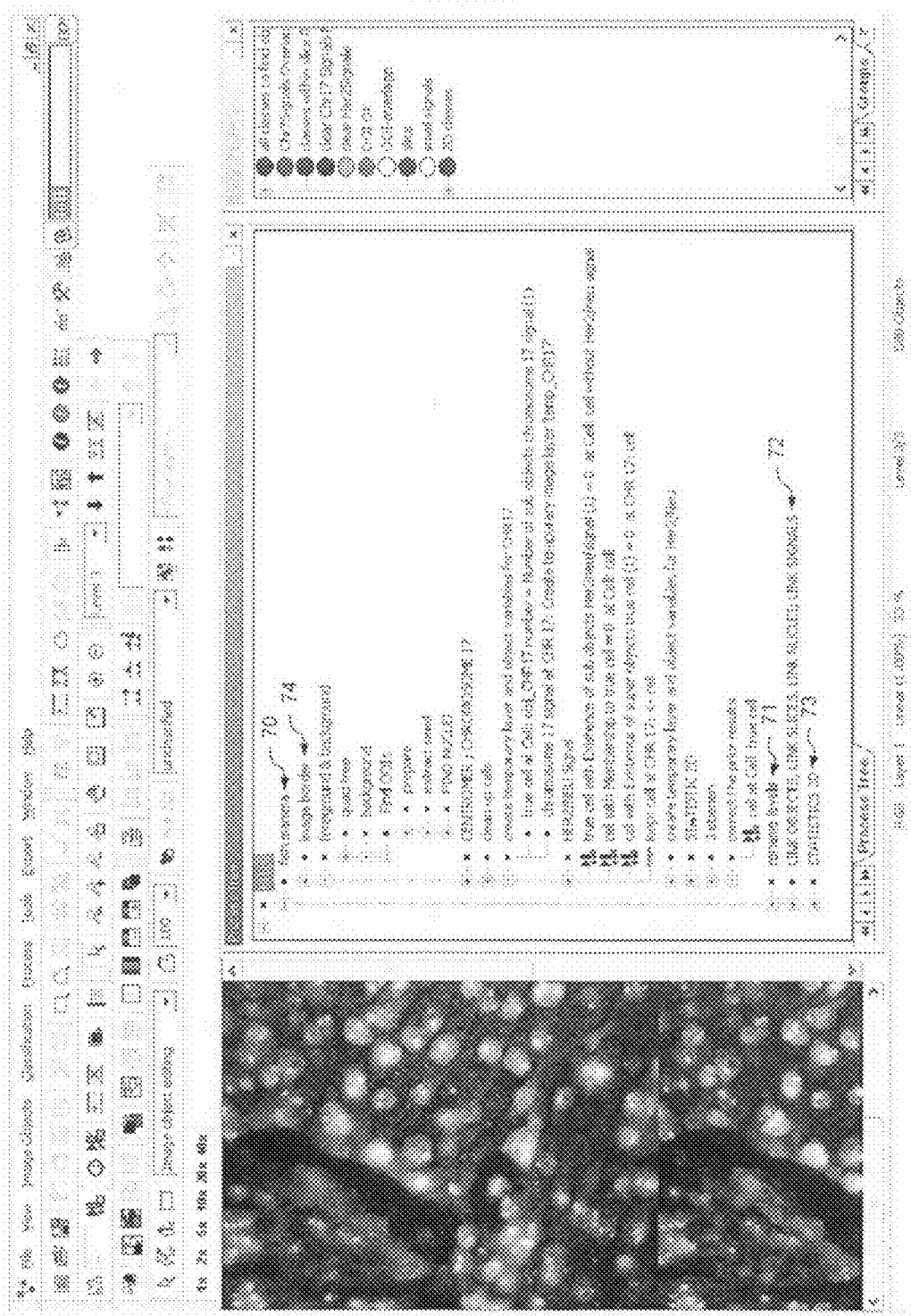
FIG. 17 is a screenshot of the graphical user interface of the analysis system containing an outline representation of the process hierarchy of FIG. 16.

FIG. 17 is a screenshot of a view of a graphical user interface generated by the analysis system. The screenshot includes a middle window containing an outline representation of the process hierarchy 38 of FIG. 16. Corresponding process steps from FIG. 16 are labeled in FIG. 17. The substeps of subprocess step 74 have been expanded, and the substeps of the other process steps are hidden in this graphical user interface. The user can add and delete process steps from the process hierarchy 38 by using pull-down windows that appear in response to a right mouse click.

Figure 18:
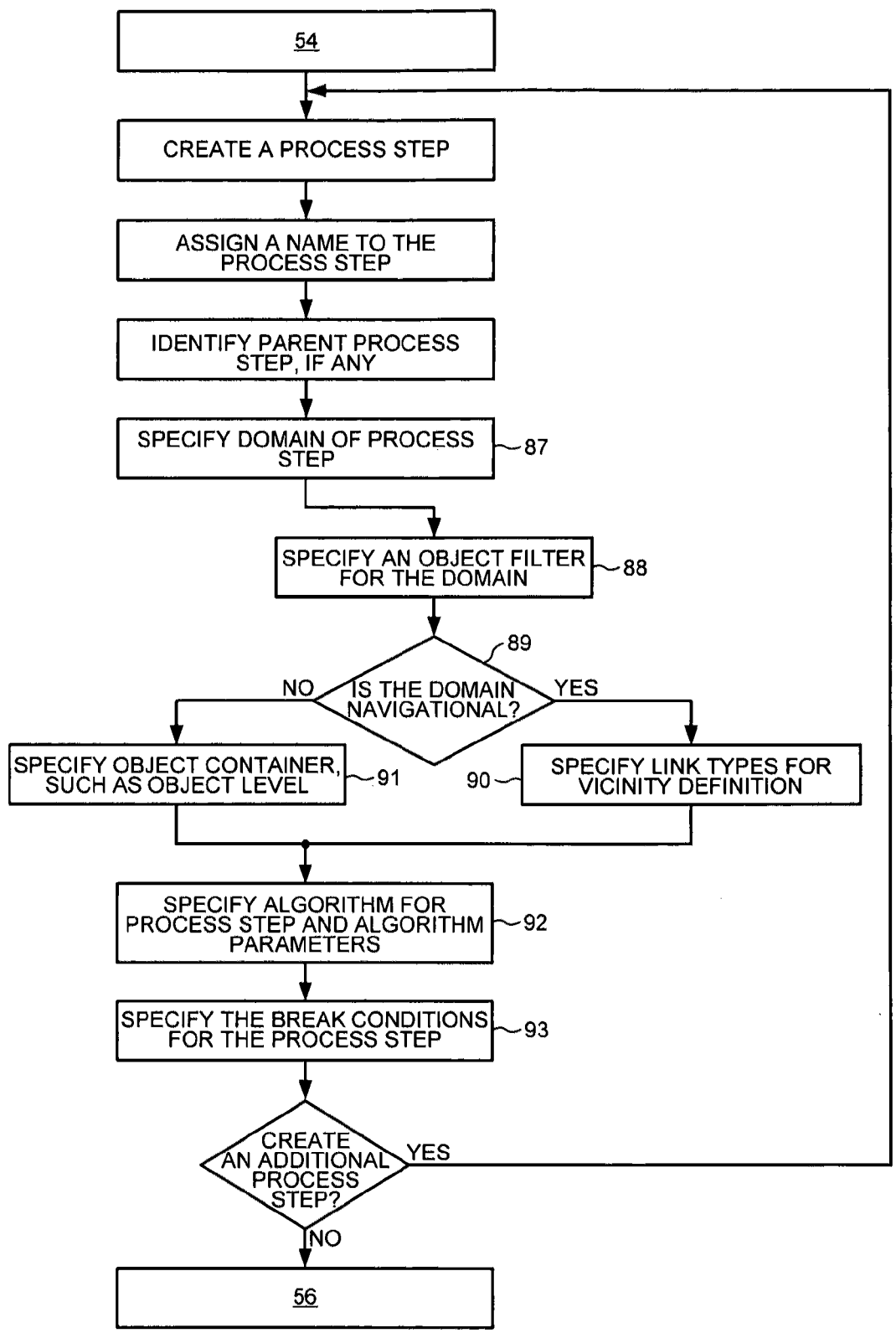
FIG. 18 is a flowchart showing the substeps of the second step of FIG. 13 for specifying the process hierarchy of FIG. 16.

FIG. 18 is a flowchart that illustrates the substeps of step 55 of FIG. 13 in more detail. In a substep 87, the user specifies the domain of the process step that the user has created. In a substep 88, the user specifies an object filter for the domain. For example, from the objects within the domain, the object filter passes to the algorithm all of those objects that are linked to fewer than sixteen pixel values. In a decision substep 89, the analysis system queries the user as to whether the domain is navigational. The user is queried by a dialogue in a pop-up window. The domain is navigational when the objects to be operated upon are defined based on how they are linked to other objects. For example, a domain may include only those subobjects that are linked by a certain type of link to a parent objects. If the domain is navigational, in a substep 90 the user specifies the link types that define the vicinity of the parent object. If the domain is not navigational, in a substep 91 the user specifies an object container for the objects that are to be operated upon by the algorithm of the process step. For example, the object container can be all of the objects at a specified object level. The level of objects linked directly to table data values is referred to as object level zero. Objects linked directly to objects in object level zero are considered to be in object level one, and so forth.

In a substep 92 of step 55 of FIG. 13, the user specifies the algorithm that will operate on the objects specified in the domain. The user can choose preformulated algorithms from a database of algorithms accessed by the analysis system. For example, some algorithms are used for the segmentation of objects. Other algorithms are used for computation, such as for statistical calculations or to calculate the area of pixels linked to an object.

Figure 19:
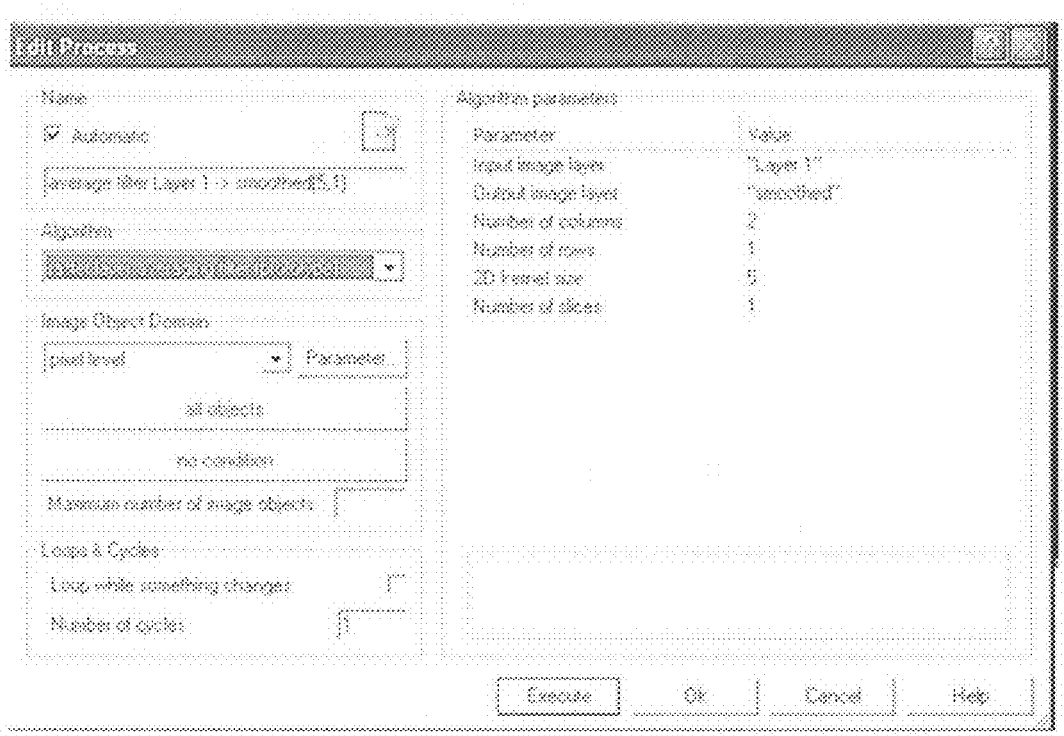
FIG. 19 is a screenshot of a pop-up window generated by the analysis system to assist in specifying an algorithm in a step of FIG. 18.

FIG. 19 shows a screenshot of a pop-up window generated by the analysis system to assist the user to specify the algorithm as described in substep 92.

Returning to FIG. 18, in a substep 93, the user specifies a break condition at which the algorithm stops operating on objects. For example, the algorithm may be iterative and operate on a group of objects a predetermined number of times, as defined by the break condition.

In step 56 of FIG. 13, the user then specifies various types of links. In network structure 35, links can be between objects, between classes, and between process steps (collectively referred to here as nodes). In addition, there can be links between a class and an object, between a class and a process step, between a process step and an object, between a process step and table data, and between an object and table data. The links between a class and an object, between a process step and an object, and between an object and table data exit in network structure 35 only at run time during the execution mode of the analysis system. The user then uses the link types to define the relationship between the nodes of the class network and process hierarchy that the user specifies in the specification mode. In addition, the user uses the link types to define the relationship between the objects of the data network and the other nodes of network structure 35 that are to be generated at run time.

Figure 20:
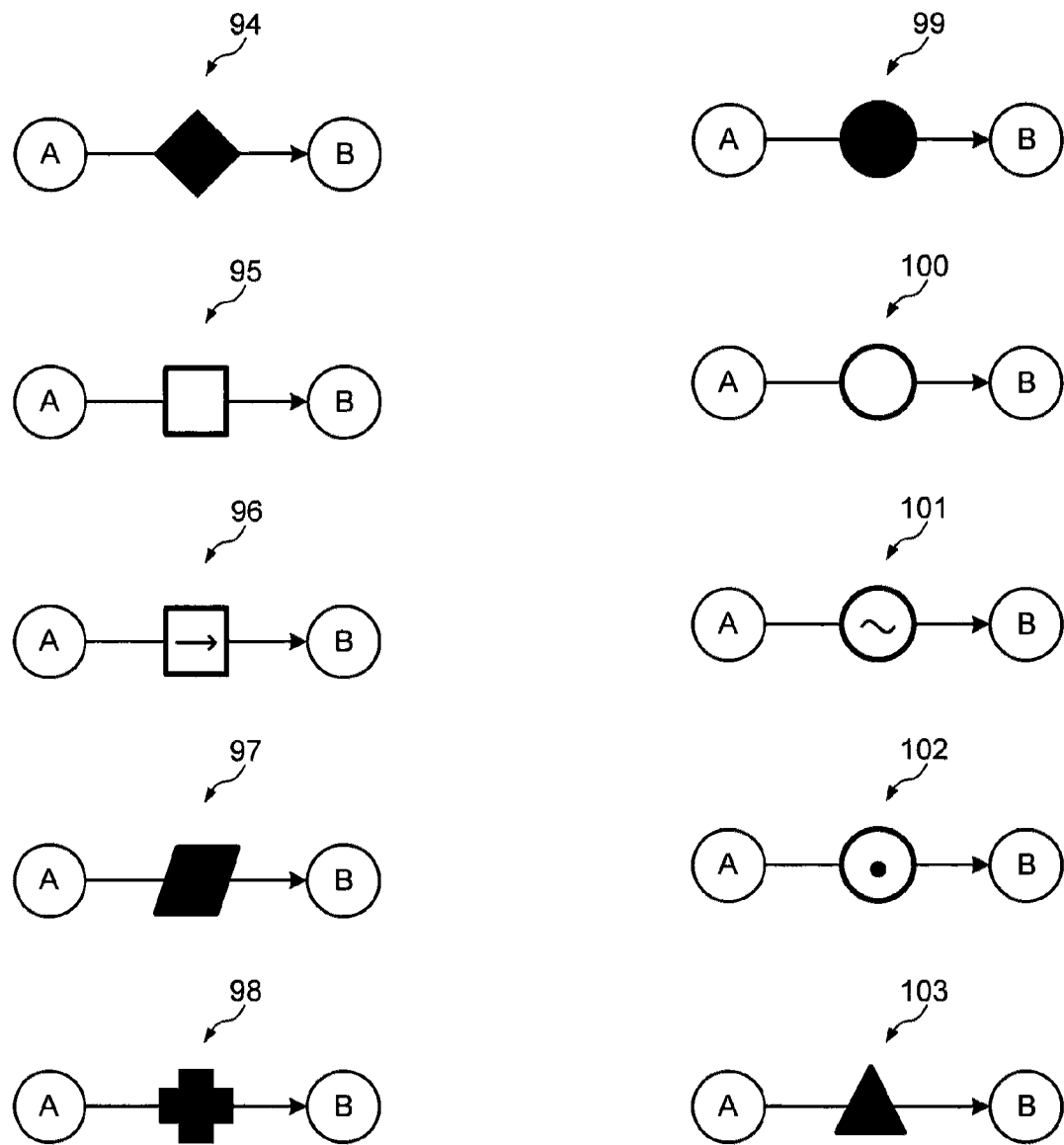
FIG. 20 is a diagram showing representations of various types of links in the computer-implemented network structure of FIG. 10.

FIG. 20 shows representations of various types of links 94-103 in network structure 35. The links describe the relation between the objects, classes and process steps. The most elementary types of links are either (i) exchange-relation links or (ii) relation links. Exchange-relation links describe an abstract, material or communicative exchange between nodes. Relation links, on the other hand, describe the relationship between nodes depending on relational contents. Where information is structured hierarchically, links are further subdivided into two groups. The first group links nodes at different hierarchy levels. The second group links nodes at the same hierarchy level.

Link 94 represents an exchange-relation link that connects nodes at different hierarchy levels. Link 94 represents the relationship between a larger, super-ordinated node A and a smaller, subordinated node B. Thus, link 94 represents a change in scale of information and denotes "B is part of A". Links 95-97 are exchange-relation links that connect nodes in the same hierarchy levels. These links do not represent a change in scale of information and denote "B is an output quantity of A". For example, the link 97 denotes "B is an attribute of A".

Link 98 represents a relation link that connects nodes at different hierarchy levels and thus performs a scale change. Link 98 denotes "B in general is A". Links 99-102 represent relation links that connect nodes in same hierarchy level. Link 100 denotes "A is locally adjacent to B"; link 101 denotes "A is similar to B"; and link 102 denotes "A is followed by B".

Link 103 represents a link that connects nodes that are capable of carrying out certain operations on other nodes and links. For example, a node connected to link 103 can generate new nodes or links and can also delete a node or a link. Link 103 denotes "B is function of A". For additional information on types of links in a semantic network structure, see U.S. patent application Ser. No. 11/414,000 entitled "Situation Dependent Operation of a Semantic Network Machine," filed on Apr. 28, 2006, which is incorporated herein by reference.

Although in the embodiment of FIG. 13 the link types are specified in step 56 after the class network and the process hierarchy are specified, in other embodiments the link types are specified before the class network and the process hierarchy are specified.

Figure 21:
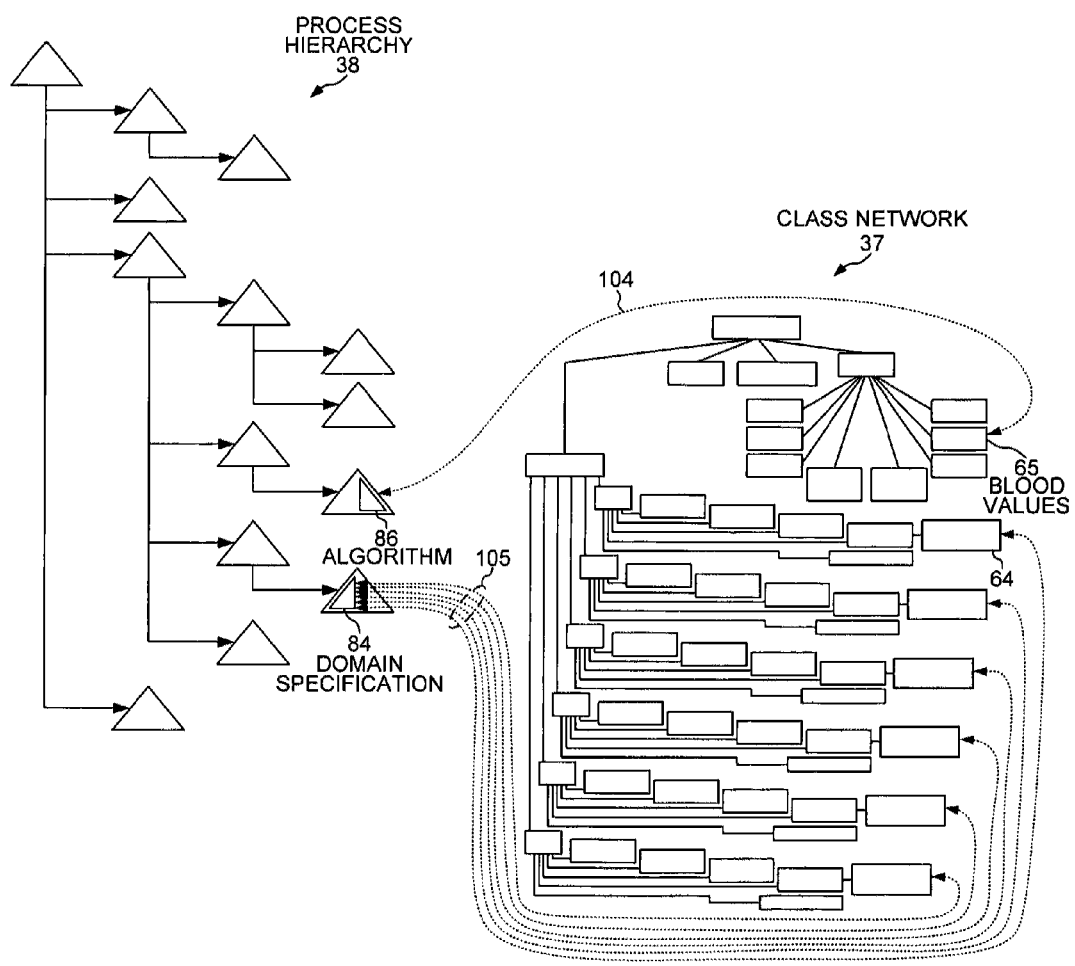
FIG. 21 is a simplified schematic diagram of the computer-implemented network structure of FIG. 10 after the class network and process hierarchy have been specified in the specification mode.

FIG. 21 illustrates the condition of computer-implemented network structure 35 in the specification mode after the user has specified class network 37 in step 54, process hierarchy 38 in step 55, and the link types in step 56. In this example, in the specification mode the user has specified a link 104 between algorithm 86 and subclass 65 (Blood Values) of class network 37. The user specifies link 104 by specifying that algorithm 86 determines which nuclei overlap one another depending on the blood values of the patient. In the specification mode, the user has also specified links 105 between domain specification 84 and subclasses of class network 37, including a subclass 64 (Centromere Overlapping a Gene). The user specifies links 105 by specifying that domain 84 includes the objects that are determined in the execution mode to belong to subclass 64 and the analogous subclasses of the other cells.

In step 57 of FIG. 13, the analysis system acquires the values of first data table 39 and second data table 40. In this example, the pixel values of the images of FIG. 11 are generated by a confocal microscope. In other embodiments, the images are generated by an X-ray mammography device, a computed tomography (CT), an ultrasound imaging device, or a magnetic resonance imaging (MRI) device. The confocal microscope includes an image digitizer that converts the acquired images into digital images. In other embodiments, physical film of microscopic images is sent through a film digitizer to obtain the pixel values of the data tables. In yet other embodiments, the microscopic images are produced directly in digital format. The digital pixel values of the data tables indicate both the brightness levels and the color in the space domain of the images of FIG. 11. Thus, each image slice is captured using multiple wavelength channels, in this example corresponding to red, green and blue. Metadata values are also acquired in step 57. In this example, some of the metadata is in text format, such as the identity of medication prescribed for the patient. Other metadata, such as the patient's weight, is in the form of a digital number.

In step 58 of FIG. 13, the analysis system runs in the execution mode and generates data network 36 by selectively linking table data values to objects according to the class network and the process hierarchy. While the classes of class network 37 describe what the user expects to find in the table data values, the objects reflect what the analysis system actually finds in the table data values. At run time in the execution mode, the analysis system executes the process steps as specified in process hierarchy 38. Each object is generated by linking to that object pixel values having similar characteristics, such as brightness or the difference in brightness between a pixel and its neighbors. Thresholds of brightness of pixels that are associated together can be obtained from a gradient histogram of the pixel values in the digital image. The objects are then linked together into classes according to the membership functions of the classes. Thus, classes are linked to objects at run time. In addition, classes and process steps are linked to table data at run time.

Figure 22:
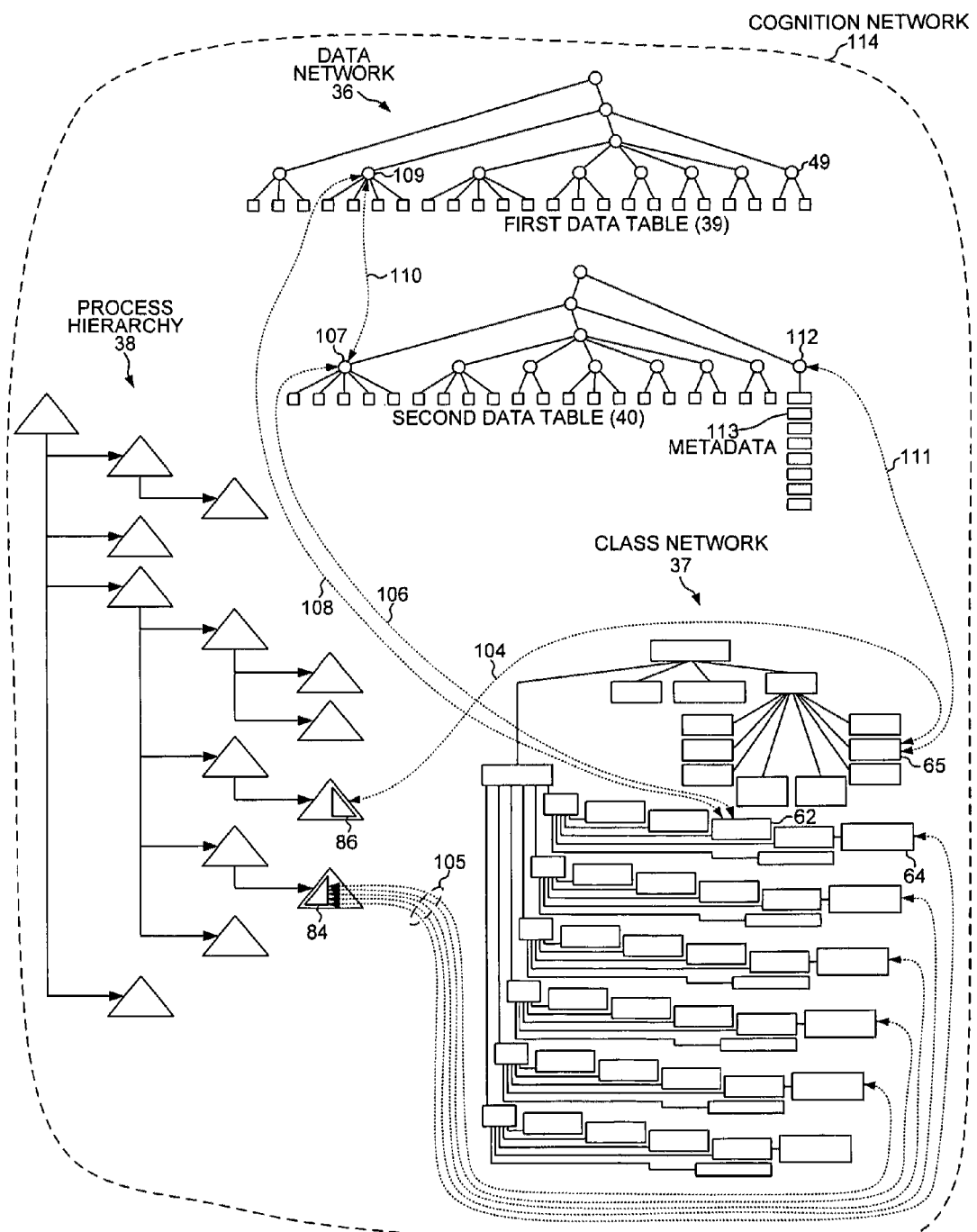
FIG. 22 is a simplified schematic diagram of the computer-implemented network structure of FIG. 10 after the data network has been generated in the execution mode.

FIG. 22 illustrates the condition of computer-implemented network structure 35 in the execution mode after the analysis system has generated data network 36. Various classes of class network 37 have been linked to objects in data network 36 that belong to the classes. For example, the subclass 62 specifying a Her-2/neu gene of cell number one is linked by a link 106 to an object 107, which in turn links pixel values of the image slice of second data table 40. Similarly, subclass 62 of cell number one is linked by a link 108 to an object 109 that links pixel values of the image slice of first data table 39.

In addition, FIG. 22 shows that while the Cognition Program is running, links are also generated between classes, process steps, objects and table data. For example, object 107 representing pixel values of an Her-2/neu gene in the image slice of second data table 40 is linked by a link 110 to object 109 representing pixel values of the same Her-2/neu gene in the image slice of first data table 39. Thus, the analysis system recognizes that the pixels values belonging to both object 107 and object 109 are associated with the same Her-2/neu gene.

Moreover, algorithms are linked to table data values. For example, algorithm 86 is linked by link 104 to class 65 (Blood Values) in the specification mode. In the execution mode, class 65 is linked by a link 111 to an object 112 for patient metadata. Thereafter in the execution mode, algorithm 86 is linked to an item of metadata 113 that contains a value representing the patient's blood values. Network structure 35 is shown in FIG. 22 as a cognition network 114 when links are present between classes, process steps, objects and table data at run time in the execution mode.

Figure 23:
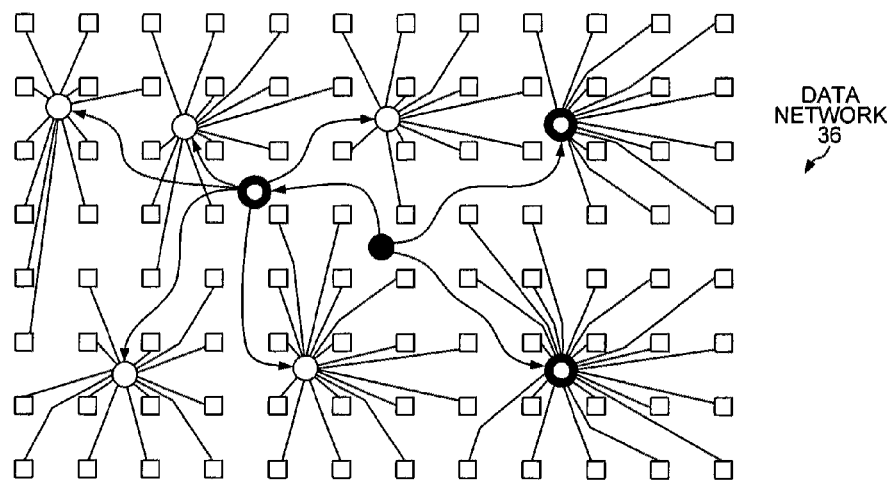
FIG. 23 is a simplified diagram of a data network in which pixel values are linked to objects.

FIG. 23 illustrates objects that have been linked to table data values having similar characteristics. In addition, objects are linked to other objects according to the membership functions that define the classes. The table data values of FIG. 23 are arranged to illustrate that they are pixel values of a digital image. For example, one factor of a membership function is the area occupied by the pixels that make up the object. In one example, the area is calculated as being proportional to the number of pixel values linked to the object.

Figure 24:
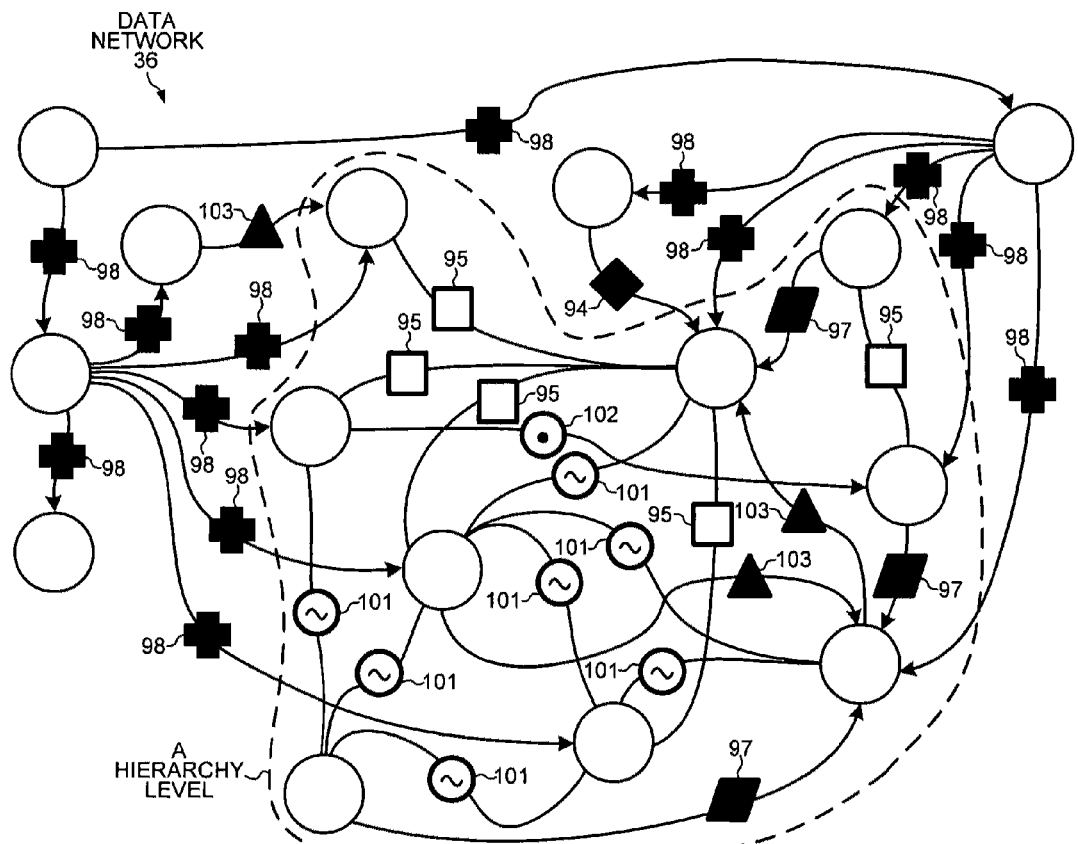
FIG. 24 is a simplified diagram of a data network in which objects are linked to other objects by various types of links.

FIG. 24 illustrates objects linked to other objects in data network 36. The objects are linked by the link types shown in FIG. 20. In the execution mode, an object that belongs to a class is linked to another object that belongs to another class when the two classes are linked together in class network 37.

Figure 25:
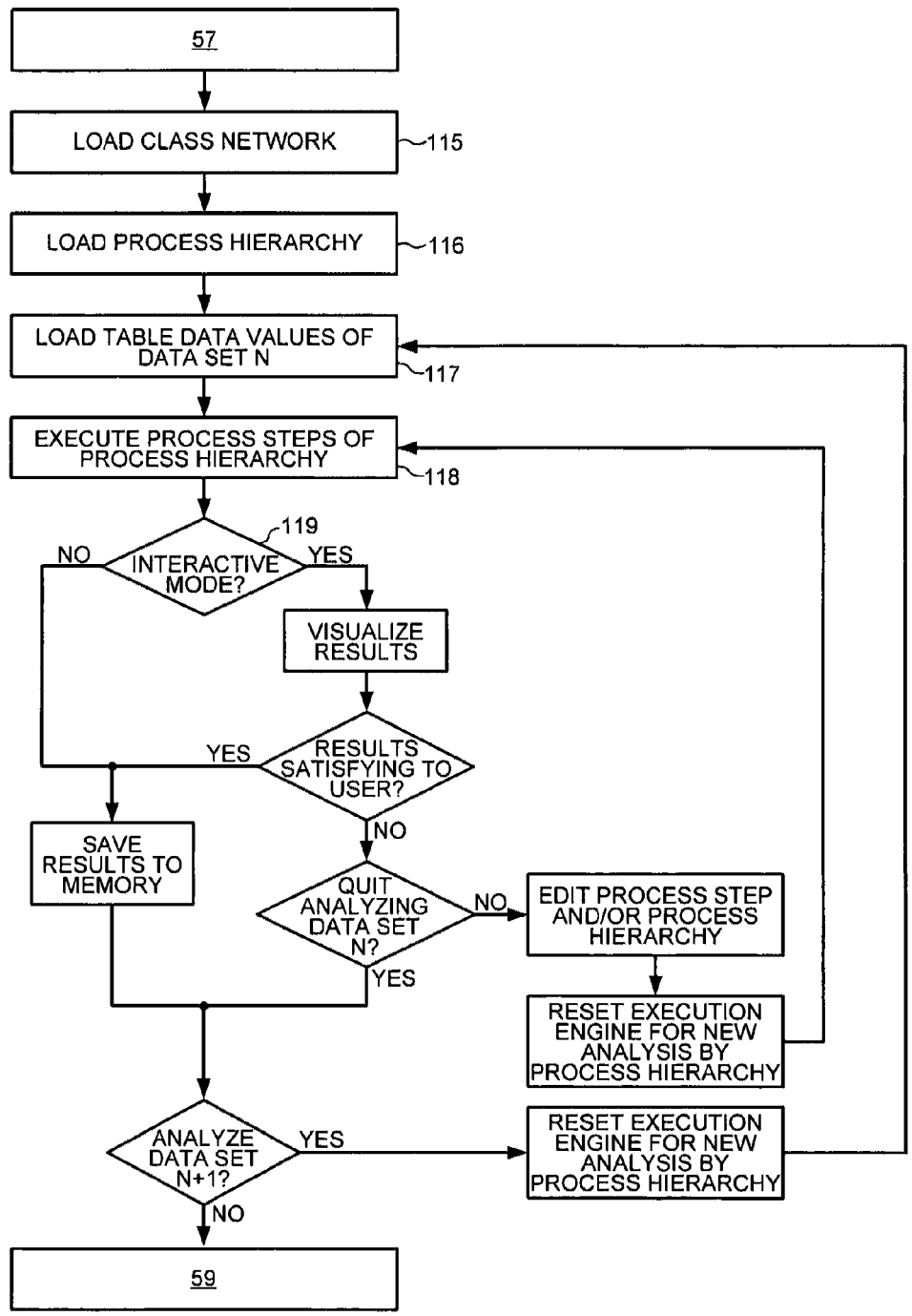
FIG. 25 is a flowchart showing the substeps of the fifth step of FIG. 13 for generating the data network of FIG. 10.

FIG. 25 is a flowchart that illustrates the substeps of step 58 of FIG. 13 in more detail. In a substep 115, the class network that is specified in step 54 of FIG. 13 is loaded into a script execution engine of the Cognition Program. In a substep 116, the process hierarchy that is specified in step 55 of FIG. 13 is loaded into the execution engine. In a substep 117, a data set N of the table data values acquired in step 57 of FIG. 13 is loaded into the execution engine.

In a substep 118 of step 58 of FIG. 13, the process steps specified in step 55 of FIG. 13 are executed on the data set N. In substep 119, the user has the option to run the Cognition Program in an interactive mode. In the interactive mode, the results of the computer-aided detection are displayed to the user, such as a research doctor. If the user is not satisfied with the results, the user can edit the classes of class network 37 or the process steps of process hierarchy 38 and immediately re-execute the process steps on the data set N. The user can edit the process steps using the graphical user interface and the script editor of the Cognition Program.

Figure 26:
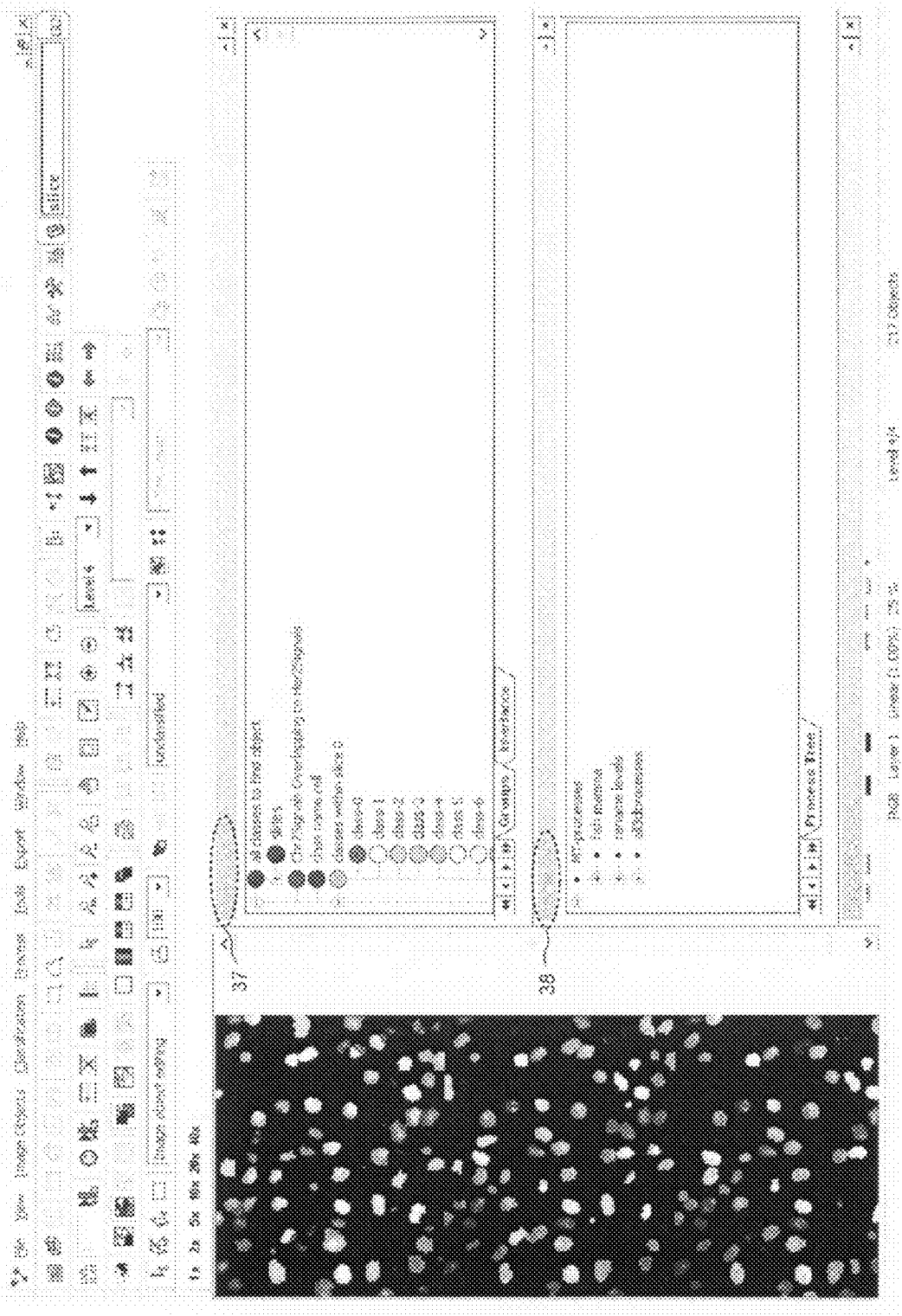
FIG. 26 is a screenshot of a graphical user interface generated by the analysis system to assist in the editing of the class network and process hierarchy of FIG. 10.

FIG. 26 is a screenshot of one view of the graphical user interface generated by a view module of the Cognition Program. The screenshot includes a window containing three image slices (top, middle and bottom) at three successive depths of in the z-dimension. The image slices show cell nuclei. The user can edit the class network 37 and the process hierarchy 38 using the windows on the right of the screenshot so that the target region recognized by the particular process step being edited is satisfactory. For example, by right mouse clicking on a process step in the lower right window, a pup-up window appears with a dialogue asking the user whether he wishes to add a sub-process step or append a process step below the clicked process step. The user is then asked to choose a domain and an algorithm for the new process step. Existing process steps can also be edited.

The user can also add or edit classes using the upper right window. A class is also added by right mouse clicking and responding to the queries in the pop-up window. The user is asked to name the new class and enter properties of objects that belong to the class, such as color, area, asymmetry, density and the angles along the border of the object. Thus, the Cognition Program can also analyze color digital images. In this embodiment of the analysis system that automatically counts fluorescence signals present in biopsy tissue marked using the FISH technique, the Cognition Program analyzes images slices acquired using red, green and blue color channels as shown in FIG. 12. In the image slice shown in the graphical user interface in FIG. 26, however, the colors of the nuclei do not correspond to the spectral colors used to acquire each image slice. Instead, the user has assigned each nucleus to a different class. Then, for ease of viewing, the user has assigned a different color to each class that is shown on the graphical user interface.

As part of creating a class, the user also defines a membership function for objects that belong to the class. For example, the user can define an "asymmetry function" as part of the membership function. The asymmetry function describes the shape of the pixels that make up an object by approximating an ellipse. For example, the user can use the asymmetry function to classify nuclei objects. The numerator of the asymmetry function describes the long axis of the ellipse, and the denominator describes the short axis. A shape of pixels that approximates a circle has an asymmetry value of one. An elongated shape of pixels has an asymmetry value much greater than one. The user can also define a "density function" to classify nuclei objects. The density function is the square root of the area of the pixels divided by the length of the border around the pixels that comprise the object. The asymmetry function and the density function can be used in the diagnosis of breast cancer. The shape of a nucleus in a cancerous cell is different from the shape of a nucleus in a normal cell.

Figure 27:
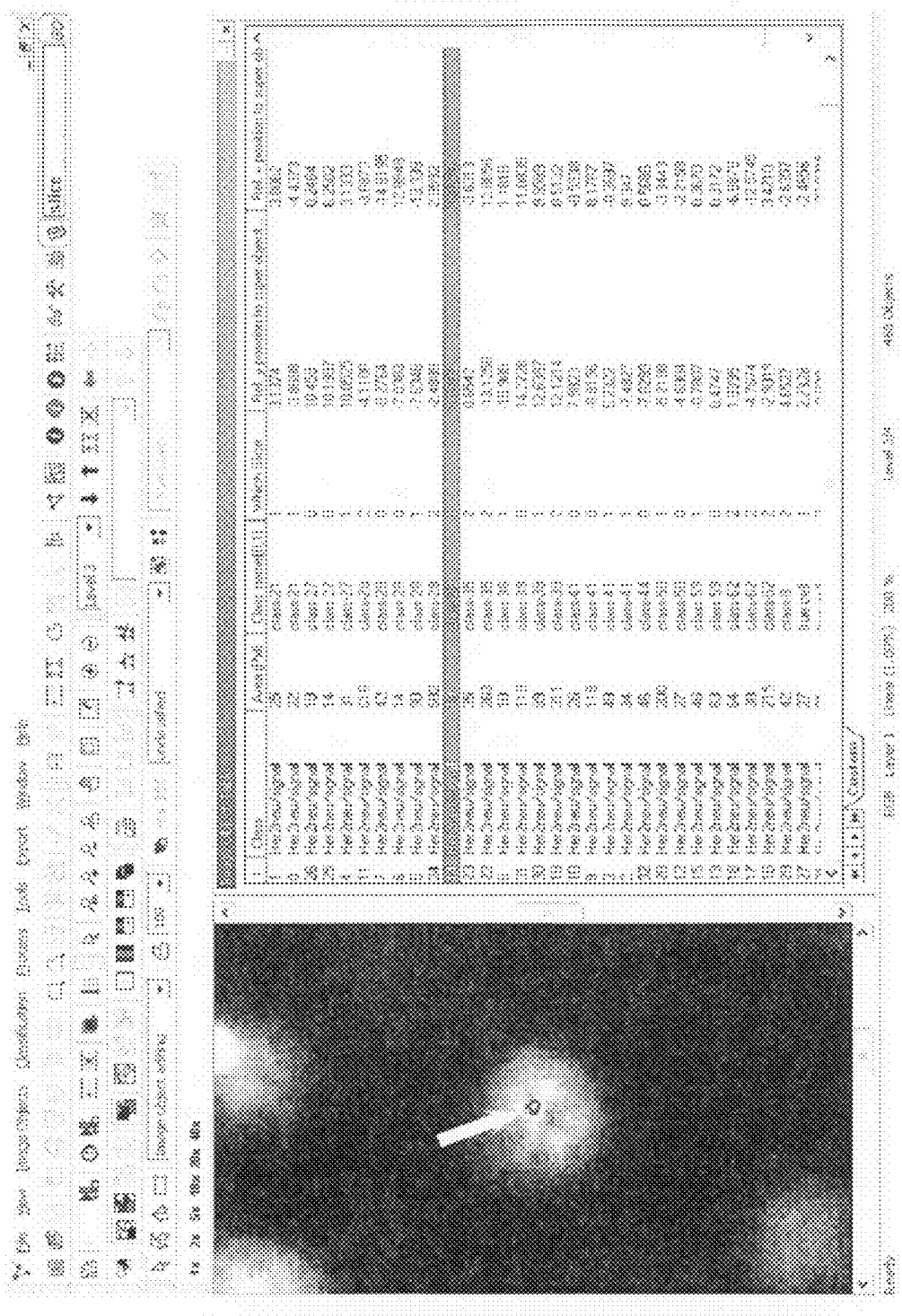
FIG. 27 is a screenshot of the graphical user interface generated of the analysis system with a window showing an outlined Her-2/neu gene in a nucleus.

FIG. 27 is a screenshot of another view of the graphical user interface generated by the view module of the Cognition Program. The screenshot includes a window on the left showing a portion of an image slice in which an Her-2/neu gene in a nucleus has been outlined. A window on the right provides information about each Her-2/neu gene in the image slice, including the outlined Her-2/neu gene. For example, the analysis system indicates that the outlined Her-2/neu gene has an area of nineteen pixels. The analysis system also indicates the x-y coordinates of the outlined Her-2/neu gene within the image slice.

Figure 28:
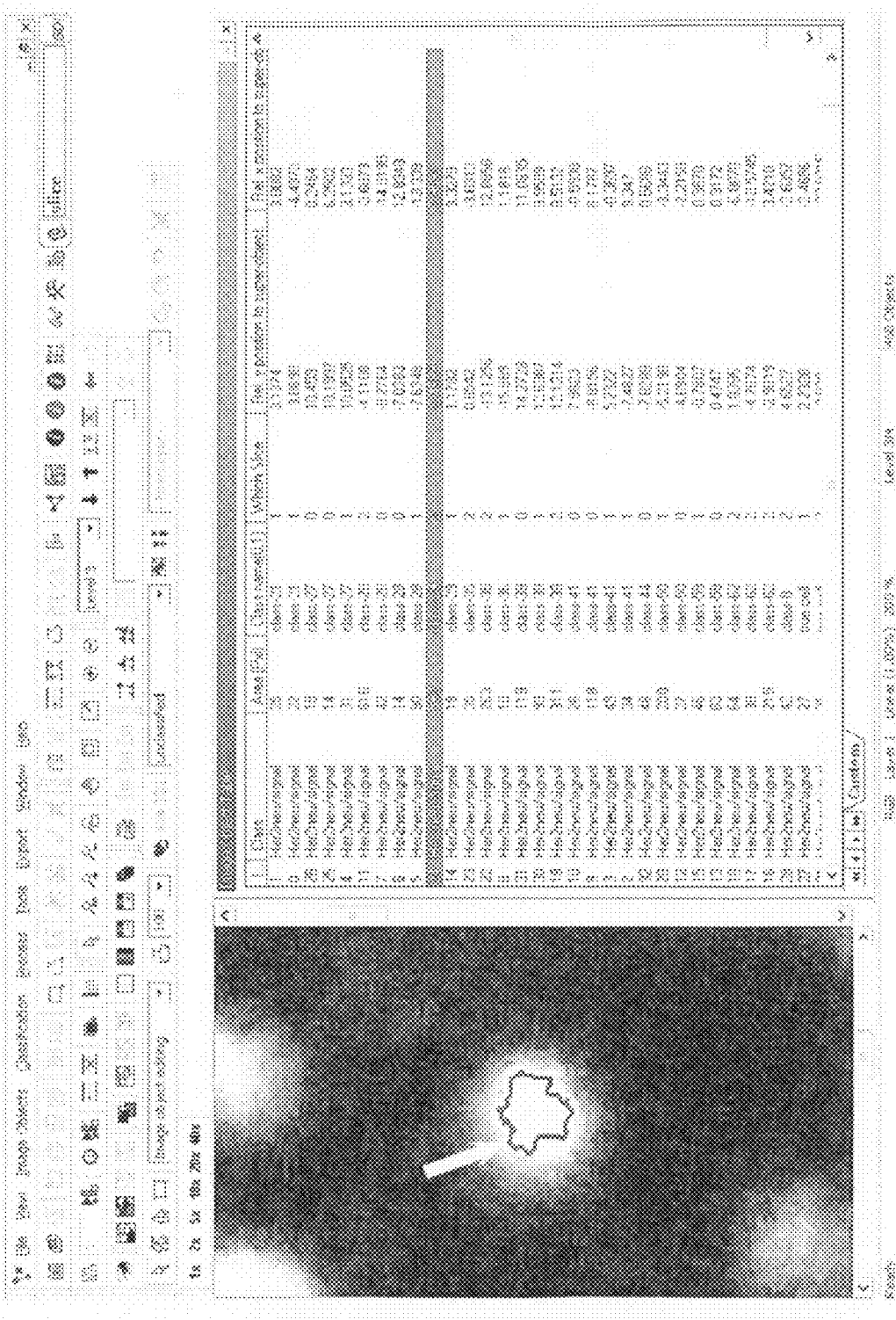
FIG. 28 is a screenshot of the graphical user interface generated of the analysis system with a window showing the outline of what appears to be an Her-2/neu gene, but is actually an imaging artifact.

FIG. 28 is a screenshot of yet another view of the graphical user interface showing what appears to be an outlined Her-2/neu gene in the window on the left. A window on the right provides information about the outlined object. In this example, the analysis system indicates that the outlined object has an area of 582 pixels. Through the membership function of the class for Her-2/neu genes, the analysis system determines that the object is too large to be produced by an Her-2/neu fluorescence signals 19. Therefore, the analysis system determines that the object is not an Her-2/neu gene, but rather an imaging artifact. As in FIG. 27, the analysis system indicates the x-y coordinates of the outlined artifact. From the x-y coordinates, the analysis system determines that the Her-2/neu gene of FIG. 27 lies under and is covered by the artifact of FIG. 28. Nevertheless, the analysis system is able to identify the Her-2/neu gene of FIG. 27.

Because class network 37 and process hierarchy 38 are specified using a Cognition Language (CL) based on the XML script language, class network 37 and process hierarchy 38 can be edited without recompiling the Cognition Program. Thus, the user can input a new membership function of a new class at run time that defines whether the objects of data network 36 will belong to the new class, and the process steps can be performed immediately on the newly generated data network 36 without recompiling the program instructions of the Cognition Program. The XML-based Cognition Language and the graphical user interface allow the user to more quickly "train" cognition network 114 to recognize Her-2/genes marked by fluorescence signals 19 and centromeres of chromosome number seventeen marked by fluorescence signals 18. The ability to edit the class network 37 and process hierarchy 38 at run time differentiates the Cognition Program from conventional CAD schemes that cannot change the process of applying rules once the CAD scheme begins analyzing a particular digital image. After the user of the Cognition Program determines that the results of the pattern recognition performed on a data set N are satisfactory, the process steps are automatically executed on the next data set N+1. The Cognition Program can then automatically perform the process steps on a large number of data sets, for example by performing the processing overnight. Reports are generated for each level of data, such as for all nuclei, for each image slice, for each z-stack and for each slide.

The Cognition Program would typically not be run in the interactive mode when the user is not a research doctor but rather a pathologist who is analyzing a new patient's biopsy tissue. A pathologist would use the Cognition Program with a class network and a process hierarchy that have already been trained by the research doctor. In that case, all of the process steps of process hierarchy 38 would be executed on all of the data sets, and the results would be saved for displaying as the final results in step 59 of FIG. 13.

Figure 29:
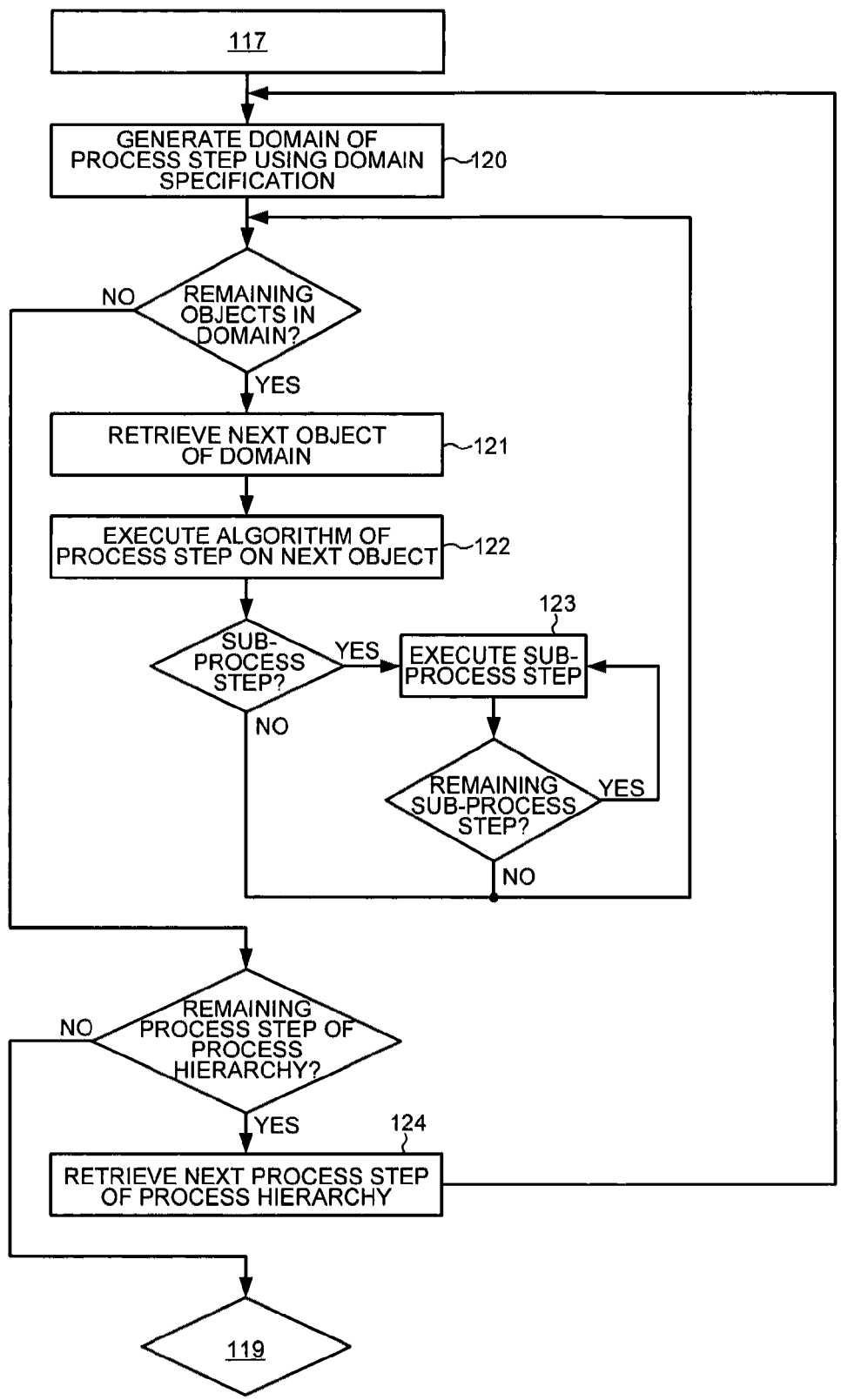
FIG. 29 is a flowchart showing the substeps of a step of FIG. 25 for executing the process steps of the process hierarchy of FIG. 10.

FIG. 29 is a flowchart that illustrates in yet more detail additional substeps of substep 118 of FIG. 25. FIG. 29 illustrates the process by which each process step of process hierarchy 38 operates on objects specified by the domain. In a substep 120, the domain that was specified in substeps 87-90 of FIG. 18 is generated. In a substep 121, the execution engine retrieves the next object of the domain that is to be operated upon. In a substep 122, the execution engine executes the algorithm of the process step on the retrieved object. In a substep 123, the execution engine executes the algorithm of any sub-process steps on the retrieved object. In a substep 124, the execution engine retrieves the next process step of the process hierarchy so that substeps 120-123 can be repeated for the domains and the algorithms of the next process step and sub-process steps, if any.

Figure 30:
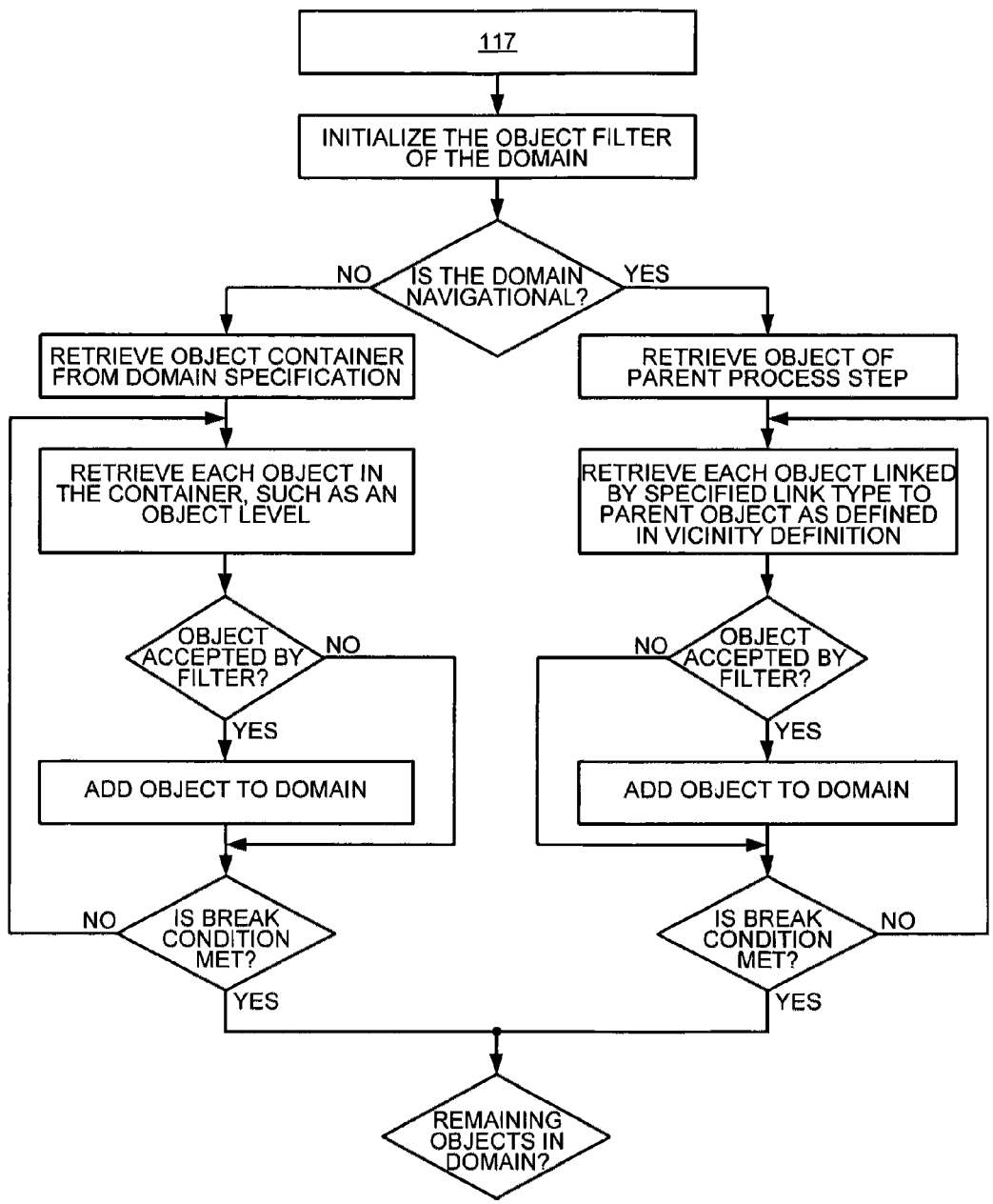
FIG. 30 is a flowchart showing the substeps of a step of FIG. 29 for generating a domain specified in a process step.

FIG. 30 is a flowchart that illustrates in yet more detail additional substeps of substep 120 of FIG. 29. FIG. 30 illustrates the process by which the domain that was specified in substeps 87-90 of FIG. 18 is generated at run time.

Returning to a final step 59 of FIG. 13, the Cognition Program outputs the final results of the computer-aided detection based on the cognition network 114 that was generated using class network 37 and process hierarchy 38.

Figure 31:
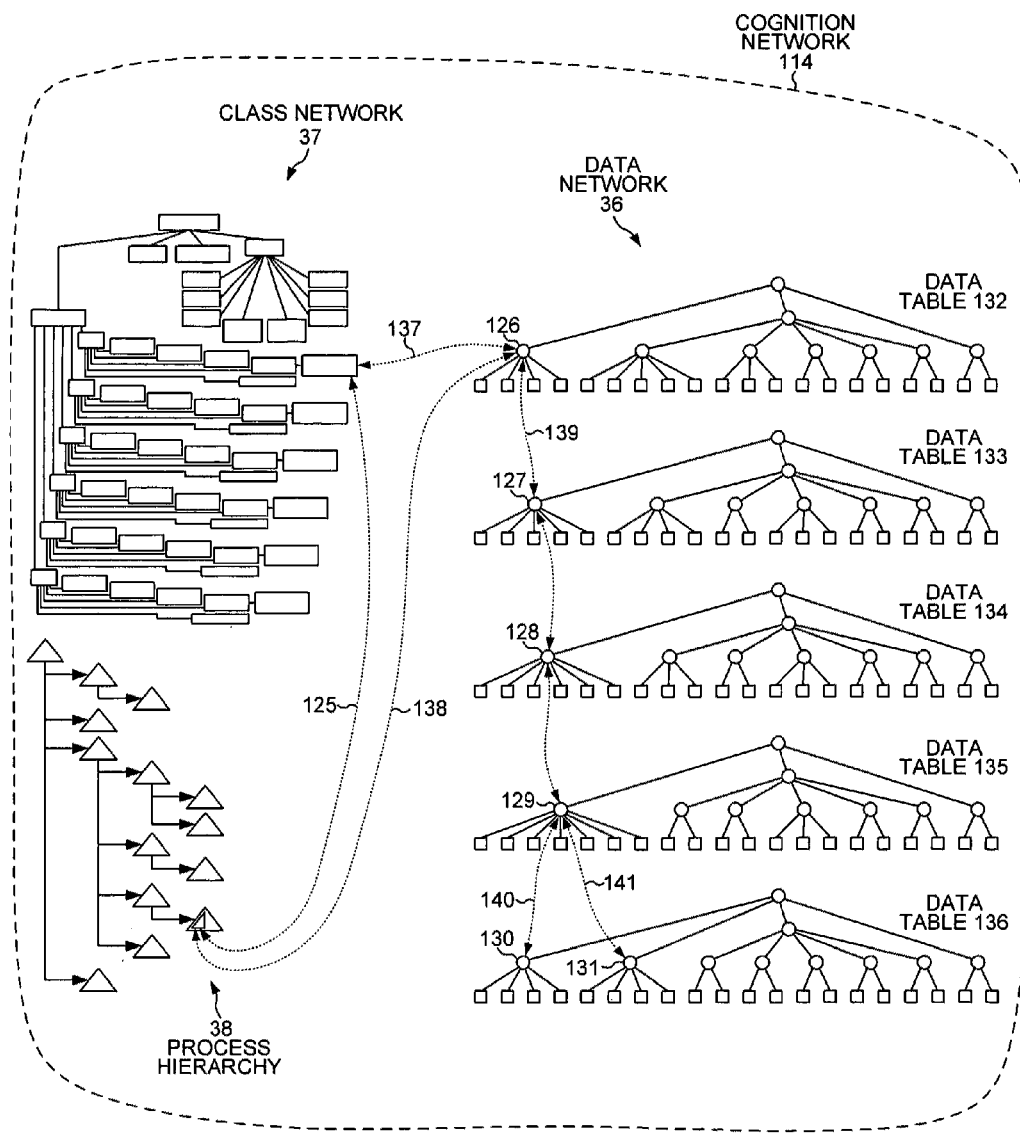
FIG. 31 is a simplified schematic diagram of a cognition network when the data network has been generated from many digital images, such as from many image slices of biopsy tissue.

FIG. 31 shows cognition network 114 of FIG. 22 when data network 36 has been generated from many data tables, each containing a digital image. Thus, FIG. 31 is a more detailed example of the diagram of FIG. 9 in which a data network is generated based on pixel values from multiple image slices. By generating data network 36 from digital images obtained from many parallel planar slices of biopsy tissue, for example, the Cognition Program detects Her-2/neu genes in three dimensions within the biopsy tissue.

FIG. 31 illustrates that in the specification mode a domain specification is linked by a link 125 to a class. In the execution mode, the Cognition Program acquires table data values comprising the many digital images that are slices of a three-dimensional data set. The Cognition Program then applies the membership function of the class to the values of each of the digital images and determines that various objects generated from the many digital images belong to the class. For example, the Cognition Program determines that each of objects 126-131 from digital images in data tables 132-136, respectively, belongs to the class. The class is then linked to each of the objects 126-131. For example, a link 137 links the class to object 126, which in turn is linked to pixel values from a first digital image in data table 132. At run time, the domain specification is then also linked to the objects that belong on the class specified in the domain specification. For example, a link 138 links the domain specification to the object 126 while the Cognition Program is running. This allows the algorithm of the process step to operate on all of the objects that comprise the 3-dimensional object, in this example an Her-2/neu gene. Finally, each of the objects 126-131 that belong to the class and that are generated from the many digital images are linked to each other in data network 36. For example, object 126, which is linked to pixel values from the first digital image, is linked by a link 139 to object 127, which is linked to pixel values from the second digital image. Because all of the objects 126-131 are identified as belonging to the same class, the physical characteristics of the class can be determined. For example, where the class is a gene clump or a nucleus, the analysis system can determine the volume of the gene clump or nucleus.

FIG. 31 also illustrates that the Cognition Program has linked an object generated from one image slice to two objects in an adjacent image slice. Object 129 that is generated from the fourth image slice is linked to two objects of the same class generated from the fifth image slice. Object 129 is linked by a link 140 to object 130 and by a link 141 to a second object 131 from the fifth image slice. In this way, the Cognition Program is able to detect 3-dimensional objects such as blood vessels that fork into multiple portions in adjacent image slices.

Linking objects in multiple scans can also be used to track movement over time. Instead of the scans representing adjacent physical planes of a physical object, multiples scans are analyzed that are acquired at different times. In one example, the objects 126-131 belong to biopsy tissue samples from the same patient that are taken at one-month intervals. The change in shape in the nuclei and the change in amplification of the Her-2/neu genes is used to provide a prognosis of the patient's condition. In another example, the objects 126-131 belong to the class representing a cell. Digital images are taken of the cell at different time intervals in minutes. Movement can be tracked by linking objects of the same class that are obtained from digital images taken at adjacent time intervals. Over the four time intervals at which the digital images of data tables 132-135 are taken, the cell described by the class linked to objects 126-129 grows from four pixels to seven pixels. Then after the fifth time interval, the cell divides into object 130 with four pixels and object 131 with four pixels. The movement and change in shape of cells and cell components need not be tracked in adjacent time intervals, but rather can be analyzed at irregular times. Movement of three- or N-dimensional objects can also be tracked. In one example, the fourth dimension analyzed is time, and the fifth dimension is speed (change in time).

In another embodiment, the Cognition Program acquires the multiple digital images from a video movie instead of from multiple scans. For example, the video movie depicts movement of a bacterium, a cell or an interphase nucleus. The Cognition Program can be used to detect one moving cell from among multiple moving cells.

In yet another embodiment, the analysis system analyzes and correlates images acquired using different imaging and marking methods. For example, data tables 132-135 include images of the same biopsy tissue taken using a microscope, an X-ray device, a computer tomograph, an ultrasound imaging device, and a magnetic resonance imaging device. Thus, the analysis system provides a multi-modal display of images obtained from multiple spectral imaging techniques. The multi-modal images are correlated to one another using the graphical user interface of the analysis system. In addition, the various images can be taken using different biomarkers, such as FISH, chromogenic in situ hybridization (CISH) and polyclonal antibody (NCL-Ki67p) labeling of the Ki67 antigen. Thus, each image of the multi-modal display shows multiple biomarkers. Images can also be taken using "multiplex" biomarkers that mark different cell components in different ways. In addition, images of marked proteins, such as estrogen and progesterone, can also be displayed and analyzed. Objects that correspond to the same marked cell components in the various multi-modal images are then linked in data network 36. Diagnoses and prognoses can be improved by correlating the results of analyzing the various images taken using different biomarkers and spectral analysis techniques.

Figure 32:
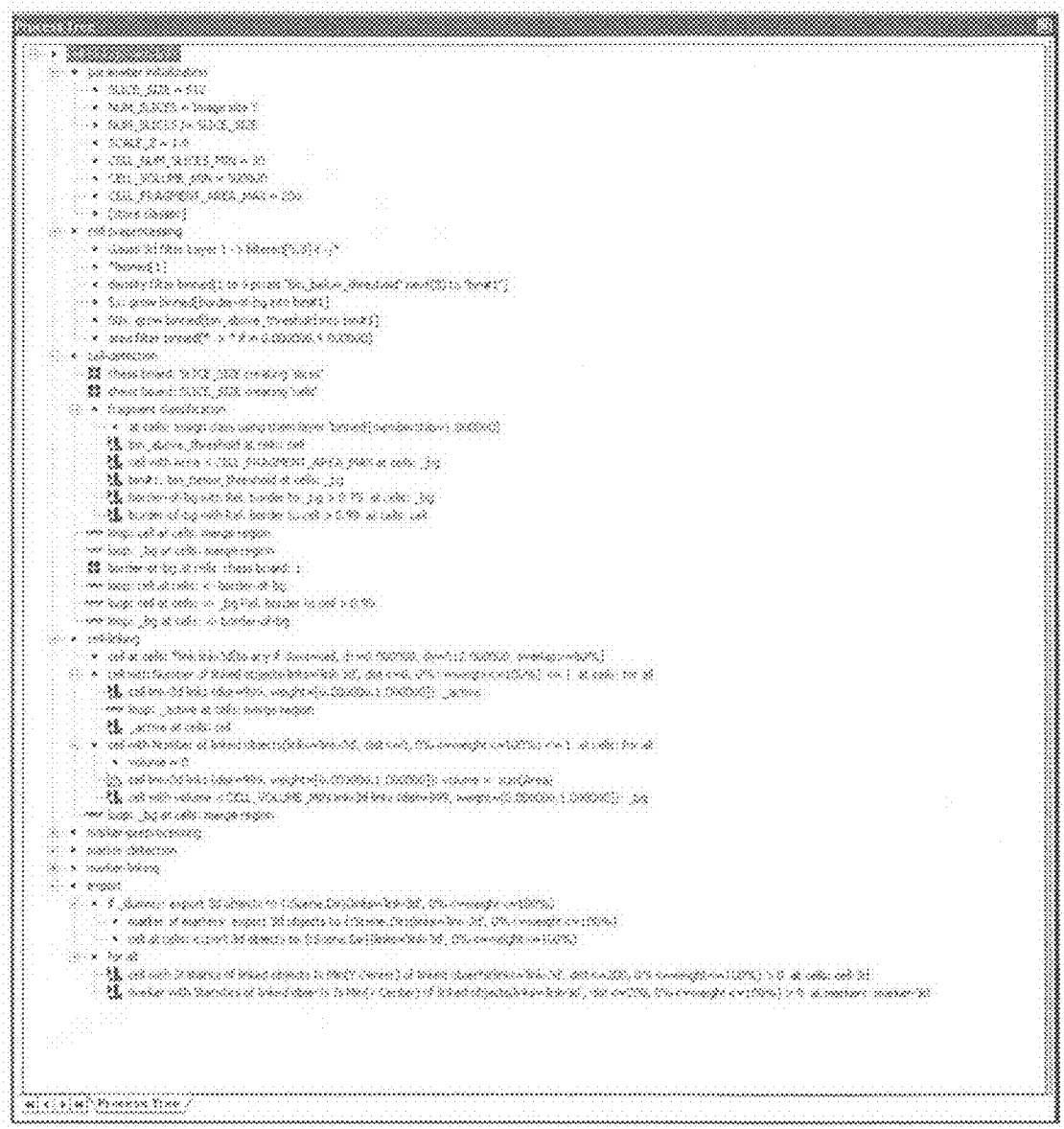
FIG. 32 is a screenshot of a process hierarchy used by another embodiment of the computer-implemented network structure of FIG. 10 to analyze individual cells in a cell assay.

FIG. 32 is a screenshot of a process hierarchy in another embodiment of cognition network 114 that analyzes individual cells in a cell assay. Three-dimensional properties of the cells are analyzed using one hundred scans at different depths of an individual cell using a confocal microscope. During the "training" process when the Cognition Program is run in the interactive mode as described by the substeps of FIG. 25, the process hierarchy of FIG. 32 is presented to the user in the lower right window of FIG. 26.

Figure 33:
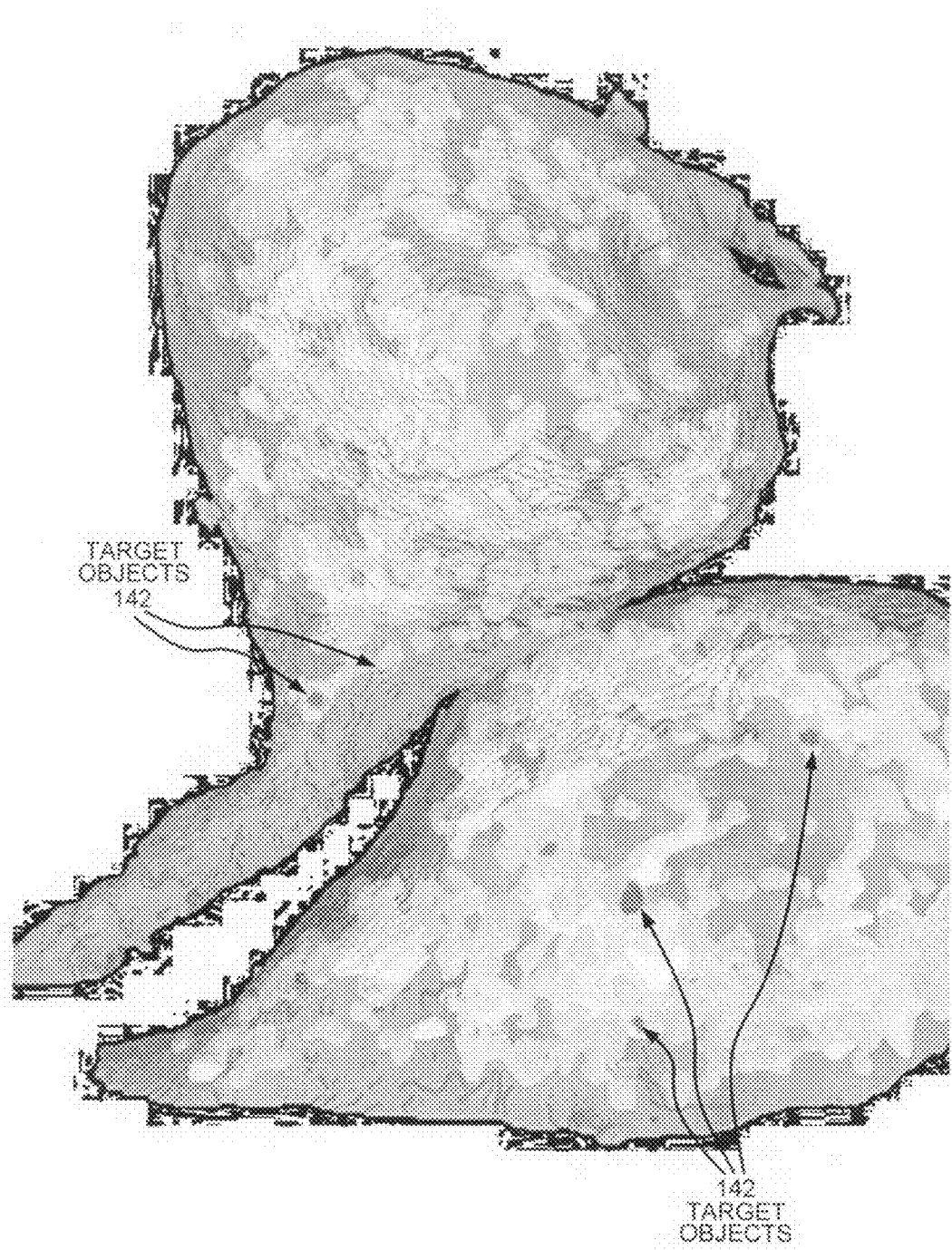
FIG. 33 is a 3-dimensional diagram of a dividing cell output in the last step of FIG. 13 with marked target objects.

FIG. 33 shows the output of step 59 of FIG. 13 as presented to the user on the graphical user interface for the embodiment of FIG. 32. Two 3-dimensional cells from a cell assay are depicted in FIG. 33. In the image of FIG. 33, target objects 142 that belong to the same class are displayed with the same color. In this example, target objects 142 are marked mitochondria. The Cognition Program compares the mean volume of the marked mitochondria to the volume of surrounding cytoplasm.

In yet other embodiments, cognition network 114 analyzes cells that are in various forms of aggregation. Individual cells in wells in plates of a cell-based assay can be analyzed. Grouped cells in a tissue formation assay can be analyzed. Tissue biopsy samples can be analyzed as described above. And tissue micro arrays containing different types of tissue can be analyzed. A tissue micro array may, for example, include tissue from the skin, breast, lungs and heart that exhibits different types of cancer. In this example, the analysis system is used to correlate the responses of the different cancer types in the different tissues to particular dosages of drugs. Thus, the analysis system is used in pharmaceutical research to analyze tissue micro arrays. In the method of FIG. 13, table data values are acquired in step 57 from images of cell tissue in multiple wells of a tissue micro array. The Cognition Program is used to look for morphological changes in the cells. The Cognition Program is used to detect motion in the cell tissue by analyzing multiple images taken of the same well after successive time intervals. The Cognition Program determines how long it takes for the cells of the tissue to stop dividing when a specified dosage of a drug is placed in the well.

FIG. 34 is a listing of high-level lines of XML code that corresponds to a CL script that implements a class network and a process hierarchy for automatically counting fluorescence signals present in biopsy tissue marked using the FISH technique. The CL script was created and edited using a graphical user interface similar to the one shown in FIG. 26. All of the lines of the XML code are present in an XML file entitled "FISH eCog converted XML.txt" and contained in the CD Appendix.

FIGS. 35A-F show more lines of the XML code of FIG. 34. The XML description of selected classes of FIG. 14 and process steps of FIG. 16 are identified by XML comments in FIGS. 25A-F. For example, FIG. 35A shows an XML description 143 of the class "Cells" of FIG. 14. The class "Cells" is identified with the class ID of "7". In addition, FIG. 35A shows an XML description 144 of a Helper class of FIG. 14 labeled as "potential Her2/neu". The Helper class is a temporary class and generates intermediate objects at run time. In addition to the Helper class that is specified by the user, the analysis system also employs dynamically generated classes. These classes are generated at run time and are deleted before the final result of classification is achieved. Intermediate objects are linked to the Helper class and to the dynamically generated classes. The intermediate objects are reclassified as the Cognition Program iteratively performs the process steps to optimize the categorization of objects into the remainder of the specified classes. Thus, performing the process steps of the process hierarchy is an adaptive process that is repeated and optimized on same digital image.

FIG. 35D shows an XML description 145 of the domain specification of a sub-process step of the sub-process step 70 (fish mamma 2D) of FIG. 16. The class ID "7" for the class "Cells" is listed under the list of classes <lClss> of the domain specification. The class ID in the domain specification generates a link between the domain specification and the class at run time. At run time, links are also generated from the domain specification of the sub-process step to the actual objects of the data network that are determined to belong to the class "Cells".

The analysis system can also be applied on stains and biomarkers other than those that mark the Her-2/neu gene, such as IHC, CISH and Ki-67. Correlations between results from these other biomarkers and those from FISH can be performed on a single specimen or tumor patient. Such an application is useful in applications of Translational Medicine and in a "Case Based Reasoning" method. Results from the analysis system can also be correlated to radiology image data in order to obtain a multiscale, multiresolution and multimodal computer-aided diagnosis. The disclosed method allows a user to correlate different image analysis results, such as between morphological and molecular pathology and between pathology and radiology. In addition, results at different clinical stages can be correlated, such as between the time of analysis and the time of treatment. In this way, detailed knowledge about the extracted objects, their mutual relationships and the entire tissue or tumor are generated.

The analysis system performs computer-aided detection (CAD) of cell components in combination with a work station. The Cognition Program runs on the work station. For faster computation and analysis, an on-chip solution incorporates the process steps into hardwired processing units of an application specific integrated circuit (ASIC) or a programmable logic device (PLD). The analysis system can also be used in conjunction with "virtual microscopy" in which automated analysis of slides is performed without manual involvement. Knowledge is extracted from a large amount of analyzed data that is acquired over many hours or days. The analysis system is used to recognize patterns and relationships in the large amount of data. For example, the analysis system recognizes patterns in the distances between nuclei containing multiple marked Her-2/neu genes and patterns in the shapes of marked Her-2/neu genes.

COMPUTER PROGRAM LISTING

A computer program listing contained in the file named FISH eCog converted XML.txt (684 KB, written to disc on Nov. 30, 2006), which is an ASCII version of the XML code that generates the visual representation of FIGS. 17 and 26-28, is publicly available in the file of the parent patent application Ser. No. 11/607,557, now U.S. Pat. No. 8,019, 134, and is incorporated herein by reference.

Although the present invention has been described in connection with certain specific embodiments for instructional purposes, the present invention is not limited thereto. For example, although embodiments of the Cognition Program and computer-implemented network structure have been described above in relation to the computer-aided analysis and counting of fluorescence signals present in biopsy tissue marked using the FISH technique, the Cognition Program and network structure can equally be applied to detecting and analyzing target patterns in other microscopic images. In addition to analyzing images acquired with conventional confocal microscopy, microscopic images acquired in the infrared light band can also be analyzed. The Cognition Program and network structure can also be used to detect and analyze anatomical regions such as the human brain, lungs and breasts, as well as microorganisms, non-living cells and the cells of plant. Thus, the analysis system can be used in environmental applications. Accordingly, various modifications, adaptations, and combinations of various features of the described embodiments can be practiced without departing from the scope of the invention as set forth in the claims.

What is claimed is:

1. A method comprising:
specifying a class network;
specifying a process hierarchy;
acquiring pixel values of an image that includes cell components, wherein certain of the cell components are marked using fluorescence in situ hybridization;
generating a data network based on the class network and the process hierarchy, wherein the data network includes an object that is linked to some of the pixel values, and wherein the object corresponds to a marked cell component; and
counting the marked cell components using the data network.

2. The method of claim 1, wherein the marked cell component is an Her-2/neural gene.

3. The method of claim 1, wherein the marked cell component is a centromere of a chromosome.

4. The method of claim 1, wherein the marked cell component is a nucleus of a cell.

5. The method of claim 1, wherein one of the cell components has a volume, further comprising:
determining the volume of the cell component using the data network.

6. A computer-readable medium that is not a transitory signal comprising program instructions for performing the steps of:
receiving a specification of a class network;
receiving a specification of a process hierarchy, wherein the process hierarchy includes process steps;
acquiring pixel values of an image that includes cell components, wherein certain of the cell components are marked using fluorescence in situ hybridization;
performing the process steps of the process hierarchy to generate a data network that includes an object, wherein the data network is generated by linking selected pixel values to the object based on the class network; and
counting the marked cell components using the data network.

7. The computer-readable medium of claim 6, wherein the object corresponds to a marked cell component.

8. The computer-readable medium of claim 7, wherein the marked cell component is an Her-2/neural gene.

9. The computer-readable medium of claim 7, wherein the marked cell component is a centromere of a chromosome.

10. The computer-readable medium of claim 7, wherein the marked cell component is a nucleus of a cell.

11. The computer-readable medium of claim 6, wherein one of the cell components has an area, having further program instructions for performing the step of:
determining the area of the cell component using the data network.

12. The method of claim 1, wherein the image is one of a plurality of parallel planar scans, wherein the generating the data network includes generating objects by linking selected pixel values of the scans to the objects, and wherein the generating the data network also includes linking the objects of adjacent scans.

13. The method of claim 1, wherein the pixel values are associated with a plurality of scans taken at different time intervals, wherein the generating the data network includes generating objects by linking selected values in each of the scans to the objects, and wherein the generating the data network also includes linking the objects of scans taken in adjacent time intervals.

14. The method of claim 13, wherein the linked objects of scans taken in adjacent time intervals depict a movement of a cell component.

15. The method of claim 1, wherein the pixel values are associated with a first group of parallel planar slices of a three-dimensional data set of a cell taken at one time and from a second group of parallel planar slices of the three-dimensional data set of the cell taken at a different time, and wherein the pixel values from the first group and the second group of parallel planar slices depict movement of the cell components.

16. A method comprising:
specifying a class network;
specifying a process hierarchy;
acquiring pixel values of an image that includes a cell component, wherein the cell component is marked using fluorescence in situ hybridization;
generating an object of a data network based on the class network and the process hierarchy, wherein the object corresponds to the cell component, and wherein the object is linked to selected pixel values; and
determining a characteristic of the cell component using the data network.

17. The method of claim 16, wherein the characteristic of the cell component is taken from the group consisting of: a three-dimensional volume of the cell component, a cross-sectional area of the cell component, a length of a border of a cross section of the cell component, and a brightness of the cell component.

18. The method of claim 16, wherein the cell component is an Her-2/neural gene.

* * * * *